(12) United States Patent
Huang

(10) Patent No.: US 11,892,608 B2
(45) Date of Patent: Feb. 6, 2024

(54) PHOTOGRAPHING OPTICAL LENS ASSEMBLY INCLUDING SEVEN LENSES OF +-++--+, +---+-+, +--+--+, +--++-+, +-+---+ OR +-+-+-- REFRACTIVE POWERS, IMAGE CAPTURING DEVICE AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/177,824

(22) Filed: Mar. 3, 2023

(65) Prior Publication Data

US 2023/0204928 A1   Jun. 29, 2023

Related U.S. Application Data

(60) Division of application No. 16/846,657, filed on Apr. 13, 2020, now Pat. No. 11,630,284, which is a continuation of application No. 16/558,116, filed on Sep. 1, 2019, now Pat. No. 10,656,395, which is a continuation of application No. 16/278,210, filed on Feb. 18, 2019, now Pat. No. 10,444,476, which is a
(Continued)

(30) Foreign Application Priority Data

Feb. 4, 2016 (TW) .................................. 105103795

(51) Int. Cl.
G02B 13/00 (2006.01)
G02B 9/64 (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
USPC ......................................................... 359/708
See application file for complete search history.

(56) References Cited

U.S. PATENT DOCUMENTS

| 4,906,077 A | 3/1990 | Ito |
| 5,260,834 A | 11/1993 | Hironori et al. |

(Continued)

FOREIGN PATENT DOCUMENTS

| CN | 203673137 U | 6/2014 |
| CN | 203941337 U | 11/2014 |

(Continued)

Primary Examiner — Wen Huang
(74) Attorney, Agent, or Firm — McClure, Qualey & Rodack, LLP

(57) ABSTRACT

A photographing optical lens assembly includes, in order from an object side to an image side, a first lens element, a second lens element, a third lens element, a fourth lens element, a fifth lens element, a sixth lens element and a seventh lens element. The first lens element with positive refractive power has an object-side surface being convex in a paraxial region thereof. The second lens element has negative refractive power. The sixth lens element has at least one of an object-side surface and an image-side surface being aspheric, wherein at least one of the object-side surface and the image-side surface of the sixth lens element comprises at least one inflection point. The seventh lens element has an object-side surface and an image-side surface being both aspheric.

12 Claims, 27 Drawing Sheets

Related U.S. Application Data continuation of application No. 15/140,831, filed on Apr. 28, 2016, now Pat. No. 10,324,272.

(56) References Cited

U.S. PATENT DOCUMENTS

| | | | |
|---|---|---|---|
| 5,570,234 | A | 10/1996 | Shibata |
| 5,808,810 | A | 9/1998 | Mihara |
| 6,014,265 | A | 1/2000 | Kato et al. |
| 6,144,499 | A | 11/2000 | Yokota et al. |
| 8,599,495 | B1 | 12/2013 | Tsai et al. |
| 8,780,464 | B2 | 7/2014 | Huang |
| 9,383,553 | B2 | 7/2016 | Shinohara et al. |
| 9,423,595 | B2 | 8/2016 | Shinohara et al. |
| 10,114,196 | B2 | 10/2018 | Dai et al. |
| 10,126,526 | B2 | 11/2018 | Kubota et al. |
| 10,302,913 | B2 | 5/2019 | Kubota et al. |
| 10,495,854 | B2 | 12/2019 | Yukio |
| 11,287,617 | B2 | 3/2022 | Sekine |
| 2012/0212842 | A1 | 8/2012 | Hosoi et al. |
| 2014/0211324 | A1 | 7/2014 | Ishizaka |
| 2015/0009578 | A1 | 1/2015 | Shinohara et al. |
| 2015/0103414 | A1 | 4/2015 | Baik |
| 2015/0198787 | A1 | 7/2015 | Kubota et al. |
| 2015/0198791 | A1 | 7/2015 | Kubota et al. |
| 2015/0247990 | A1* | 9/2015 | Kubota .................... G02B 9/64 359/755 |
| 2015/0247993 | A1 | 9/2015 | Ishizaka |
| 2015/0268448 | A1 | 9/2015 | Kubota et al. |
| 2016/0033742 | A1 | 2/2016 | Huang |
| 2016/0033743 | A1 | 2/2016 | Chen |
| 2016/0320593 | A1 | 11/2016 | Baik |
| 2016/0320594 | A1 | 11/2016 | Baik |
| 2016/0377841 | A1 | 12/2016 | Kubota et al. |
| 2017/0199352 | A1 | 7/2017 | Teraoka |
| 2018/0307006 | A1 | 10/2018 | Kang et al. |

FOREIGN PATENT DOCUMENTS

| | | |
|---|---|---|
| CN | 204028445 U | 12/2014 |
| CN | 204065534 U | 12/2014 |
| CN | 204188870 U | 3/2015 |
| CN | 204256251 U | 4/2015 |
| CN | 204314533 U | 5/2015 |
| CN | 204359999 U | 5/2015 |
| CN | 105116519 A | 12/2015 |
| CN | 205003345 U | 1/2016 |
| JP | S63292106 A | 11/1988 |
| JP | H04114116 A | 4/1992 |
| JP | H04-134410 A | 5/1992 |
| JP | H06258577 A | 9/1994 |
| JP | H08129132 A | 5/1996 |
| JP | 2000081569 A | 3/2000 |
| JP | 2000089103 A | 3/2000 |
| JP | 2009-251367 A | 10/2009 |
| JP | 2012-173299 A | 9/2012 |
| JP | 2013130723 A | 7/2013 |
| JP | 2015-072403 A | 4/2015 |
| TW | 201514531 A | 4/2015 |
| TW | I507723 B | 11/2015 |
| TW | I510804 B | 12/2015 |
| WO | 2016109938 A1 | 7/2016 |
| WO | 2017078255 A1 | 5/2017 |

* cited by examiner

PHOTOGRAPHING OPTICAL LENS ASSEMBLY INCLUDING SEVEN LENSES OF +-++--+, +---+-+, +--+--+, +--++-+, +-+---+ OR +-+-+-- REFRACTIVE POWERS, IMAGE CAPTURING DEVICE AND ELECTRONIC DEVICE

RELATED APPLICATIONS

This application is a divisional application of U.S. application Ser. No. 16/846,657, filed on Apr. 13, 2020, which is a continuation of U.S. application Ser. No. 16/558,116, filed on Sep. 1, 2019, PAT issued on May 19, 2020, which is a continuation of U.S. application Ser. No. 16/278,210, filed on Feb. 18, 2019, U.S. Pat. No. 10,444,476 issued on Oct. 15, 2019, which is a continuation of U.S. application Ser. No. 15/140,831, filed on Apr. 28, 2016, U.S. Pat. No. 10,324,272 issued on Jun. 18, 2019, which claims priority to Taiwan Application Serial Number 105103795, filed Feb. 4, 2016, which is herein incorporated by reference.

BACKGROUND

Technical Field

The present disclosure relates to a photographing optical lens assembly and an image capturing device. More particularly, the present disclosure relates to a photographing optical lens assembly and an image capturing device with a compact size applicable to electronic devices.

Description of Related Art

With the popularity of photographing module applications, utilizing photographing modules in various intelligent electronic devices, automobile devices, recognition devices, entertainment devices, sport devices and household intelligent assistance systems is becoming a major trend in developments of future technologies. For obtaining extensive experiences in utilizations of the photographing modules, intelligent devices with one or more lens assemblies are the market mainstream, and various lens systems with different features are developed in response to different demands.

In the conventional compact lens assemblies, the image quality has been compromised due to the common trend for system miniaturizations. While conventional imaging systems with high imaging quality usually adopt multi-element lens configuration of spherical glass lens elements, the size of the imaging systems would be too large and cumbersome. Also, the costs of the imaging systems would be too expensive for applications in various devices and products. Hence, conventional imaging systems cannot satisfy the current trend of the technological developments.

SUMMARY

According to one aspect of the present disclosure, a photographing optical lens assembly includes, in order from an object side to an image side, a first lens element, a second lens element, a third lens element, a fourth lens element, a fifth lens element, a sixth lens element, and a seventh lens element. The first lens element with positive refractive power has an object-side surface being convex in a paraxial region thereof. The second lens element has negative refractive power. The sixth lens element has at least one of an object-side surface and an image-side surface being aspheric, wherein at least one of the object-side surface and the image-side surface of the sixth lens element comprises at least one inflection point. The seventh lens element has an object-side surface and an image-side surface being both aspheric. The photographing optical lens assembly has a total of seven lens elements. When a focal length of the photographing optical lens assembly is f, a curvature radius of the object-side surface of the first lens element is R1, a focal length of the sixth lens element is f6, and a focal length of the seventh lens element is f7, the following conditions are satisfied:

$$2.85 < f/R1; \text{ and}$$

$$-2.0 < f6/f7 < 1.5.$$

According to another aspect of the present disclosure, an image capturing device includes the photographing optical lens assembly of the aforementioned aspect and an image sensor, wherein the image sensor is disposed on an image surface of the photographing optical lens assembly.

According to yet another aspect of the present disclosure, an electronic device includes the image capturing device of the aforementioned aspect.

According to further another aspect of the present disclosure, a photographing optical lens assembly includes, in order from an object side to an image side, a first lens element, a second lens element, a third lens element, a fourth lens element, a fifth lens element, a sixth lens element, and a seventh lens element. The first lens element with positive refractive power has an object-side surface being convex in a paraxial region thereof. The sixth lens element has at least one of an object-side surface and an image-side surface being aspheric, wherein at least one of the object-side surface and the image-side surface of the sixth lens element comprises at least one inflection point. The seventh lens element has an object-side surface and an image-side surface being both aspheric. The photographing optical lens assembly has a total of seven lens elements. When a curvature radius of the object-side surface of the first lens element is R1, a central thickness of the first lens element is CT1, a focal length of the sixth lens element is f6, and a focal length of the seventh lens element is f7, the following conditions are satisfied:

$$R1/CT1 < 2.5; \text{ and}$$

$$-0.90 < f6/f7 < 1.5.$$

DETAILED DESCRIPTION

Figure 1:
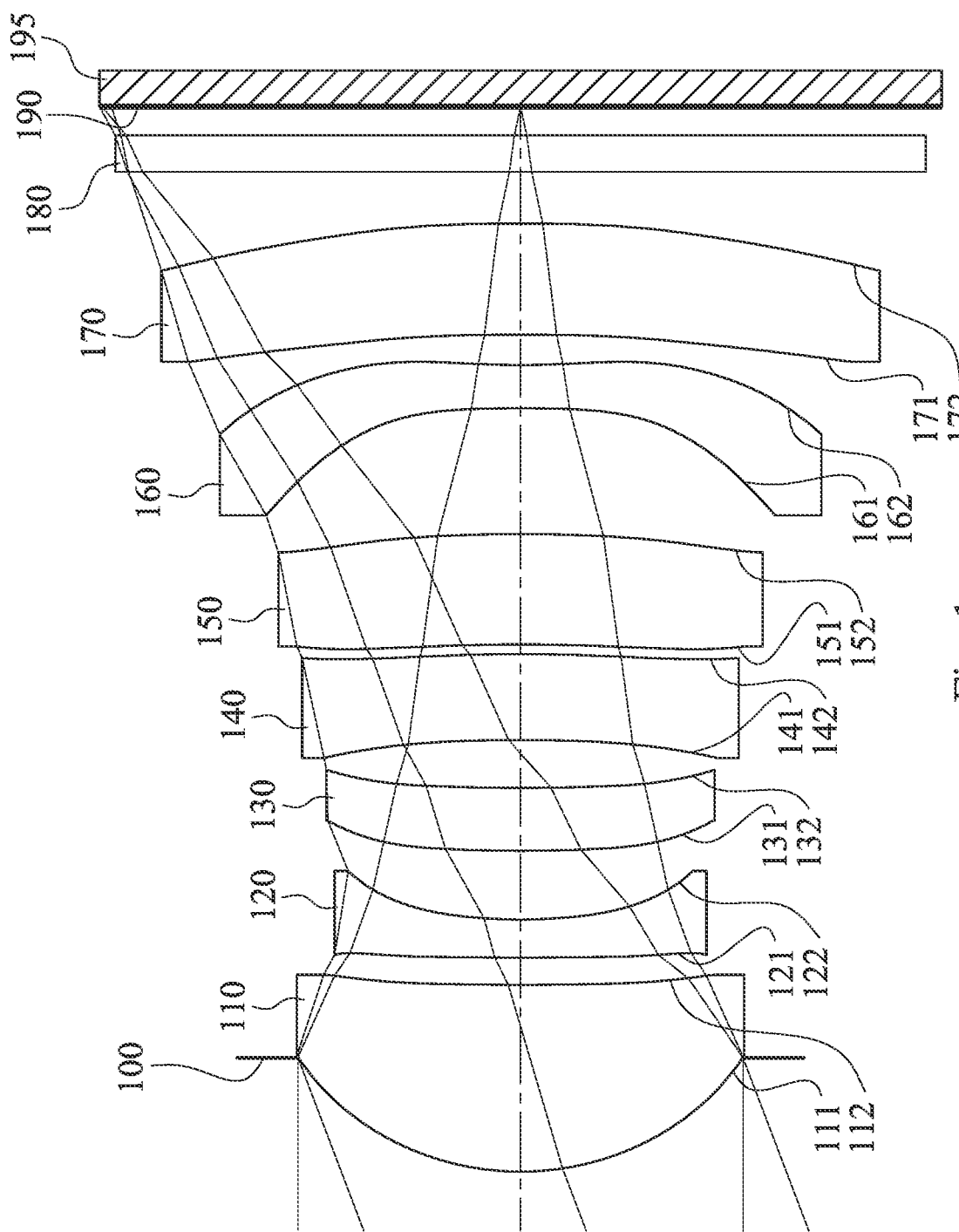
FIG. 1 is a schematic view of an image capturing device according to the 1st embodiment of the present disclosure.

A photographing optical lens assembly includes, in order from an object side to an image side, a first lens element, a second lens element, a third lens element, a fourth lens element, a fifth lens element, a sixth lens element and a seventh lens element, wherein the photographing optical lens assembly has a total of seven lens elements.

The first lens element with positive refractive power has an object-side surface being convex in a paraxial region thereof. Therefore, it is favorable for providing the main converging ability of the incident light in the photographing optical lens assembly, so that the volume of the photographing optical lens assembly can be effectively reduced to satisfy the demand of compact size.

The second lens element can have negative refractive power, and can have an object-side surface being convex in a paraxial region thereof and an image-side surface being concave in a paraxial region thereof. Therefore, focusing positions of lights with different wavelengths can be balanced so as to avoid the image overlay, and the spherical aberration can be reduced by a coordinating configuration with the first lens element.

The fourth lens element can have an object-side surface being concave in a paraxial region thereof and an image-side surface being convex in a paraxial region thereof. Therefore, it is favorable for correcting the astigmatism of the photographing optical lens assembly by balancing the light path in the tangential direction and the sagittal direction. Furthermore, at least one of the object-side surface and the image-side surface of the fourth lens element includes at least one inflection point, so that aberrations in an off-axial region thereof can be corrected.

The fifth lens element can have an object-side surface being concave in a paraxial region thereof and an image-side surface being convex in a paraxial region thereof. Therefore, it is favorable for correcting aberrations of the photographing optical lens assembly.

The sixth lens element can have negative refractive power and can have an image-side surface being concave in a paraxial region thereof. Therefore, the Petzval Surface can be flatter, and the principal point can be positioned closer to the object side so as to reduce the back focal length for controlling the total track length. Furthermore, at least one of the object-side surface and the image-side surface of the sixth lens element includes at least one inflection point. Hence, it is favorable for correcting aberrations in the off-axial region and reducing the back focal length so as to balance between the image quality and the physical size of the lens assembly.

The seventh lens element can have positive refractive power and can have an image-side surface being convex in a paraxial region thereof. Therefore, the symmetrical structure of the photographing optical lens assembly can be formed by the seventh lens element and the first lens element for improving the image quality.

When a focal length of the photographing optical lens assembly is f, and a curvature radius of the object-side surface of the first lens element is R1, the following condition is satisfied: 2.85<f/R1. Therefore, it is favorable for obtaining the telephoto characteristic and controlling the total track length of the photographing optical lens assembly at the same time so as to obtain the demand of compact size thereof. Preferably, the following condition can be satisfied: 3.10<f/R1<7.50.

When a focal length of the sixth lens element is f6, and a focal length of the seventh lens element is f7, the following conditions are satisfied: −2.0<f6/f7<1.5. Therefore, the sixth lens element can have sufficiently more refractive power than the seventh lens element, so that aberrations generated from the sixth lens element can be corrected by the seventh lens element. Preferably, the following condition can be satisfied: −0.90<f6/f7<1.5. More preferably, the following condition can be satisfied: −0.60<f6/f7<0.60. Furthermore preferably, the following condition can be satisfied: −0.40<f6/f7<0.40.

When the curvature radius of the object-side surface of the first lens element is R1, and a central thickness of the first lens element is CT1, the following condition is satisfied: R1/CT1<2.5. Therefore, the first lens element can have sufficient positive refractive power for providing the better telephoto feature of the photographing optical lens assembly. Preferably, the following condition can be satisfied: R1/CT1<2.2. More preferably, the following condition can be satisfied: R1/CT1<1.8.

When the focal length of the photographing optical lens assembly is f, and a maximal image height of the photographing optical lens assembly is ImgH, the following condition is satisfied: 2.20<f/ImgH<5.50. Therefore, it is favorable for controlling the imaging field and the angle of view effectively to enhance the resolution of the specified image area for better telephoto effects.

When the focal length of the photographing optical lens assembly is f, and a curvature radius of the image-side surface of the seventh lens element is R14, the following condition is satisfied: f/R14<1.0. Therefore, it is favorable for obtaining the telephoto feature and enhancing the symmetry of the entire photographing optical lens assembly by effectively controlling the surface shape of the lens element closest to the image surface.

When a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and a refractive power of the seventh lens element is P7, the following condition is satisfied: (|P3|+|P4|+|P5|+|P7|)/(|P1|+|P2|+|P6|)<0.50. Therefore, the refractive power arrangement of the photographing optical lens assembly can be balanced between the object side and the image side, and the symmetry of the entire lens assembly can be enhanced so as to reduce the sensitivity.

When an Abbe number of the seventh lens element is V7, the following condition is satisfied: V7<30. Therefore, it is favorable for balancing the chromatic aberration of the photographing optical lens assembly.

The photographing optical lens assembly can further include an aperture stop, which can be disposed between an imaged object and the third lens element, or further disposed between the imaged object and the first lens element.

When an axial distance between the object-side surface of the first lens element and the aperture stop is Dr1s, and a central thickness of the second lens element is CT2, the following condition is satisfied: 2.0<|Dr1s|/CT2<5.0. Therefore, it is favorable for controlling the size of the photographing optical lens assembly by effectively allocating the aperture stop, and for enhancing the manufacturability of lens molding by controlling lens thicknesses.

When a maximal optical effective radius of the object-side surface of the first lens element is Y11, and the maximal image height of the photographing optical lens assembly is ImgH, the following condition is satisfied: 0.45<Y11/ImgH<1.0. Therefore, it is favorable for obtaining the sufficient light by balancing the light incident range and the imaging area, so that the image illumination can be enhanced.

When a vertical distance between a non-axial critical point on the image-side surface of the sixth lens element and an optical axis is Yc62, and a central thickness of the sixth lens element is CT6, the following condition is satisfied: 0.5<Yc62/CT6<7.5. Therefore, it is favorable for correcting aberrations in an off-axial region, and controlling the curvature of the image field effectively.

When an axial distance between the image-side surface of the seventh lens element and an image surface is BL, and the maximal image height of the photographing optical lens assembly is ImgH, the following condition is satisfied: <BL/ImgH<0.40. Therefore, the back focal length can be controlled so as to minimize the volume of the photographing optical lens assembly for obtaining the compact size thereof.

When the focal length of the photographing optical lens assembly is f, and a focal length of the fourth lens element is f4, and the following condition is satisfied: |f/f4|<0.35. Therefore, it is favorable for the fourth lens element to obtain the aberrations correcting ability.

When an axial distance between the fifth lens element and the sixth lens element is T56, and a sum of axial distances between every two of the lens elements of the photographing optical lens assembly that are adjacent to each other is ΣAT, the following condition is satisfied: 0.40<T56/(ΣAT−T56). Therefore, it is favorable for obtaining the telephoto characteristic by controlling the light path between the fifth lens element and the sixth lens element.

Among the first lens element, the second lens element, the third lens element, the fourth lens element, the fifth lens element, the sixth lens element and the seventh lens element, at least one lens element with positive refractive power has an Abbe number which is smaller than 25. Therefore, it is favorable for obtaining various photographing ranges by effectively controlling the arrangement of the light dispersion ability.

When an axial distance between the object-side surface of the first lens element and an image surface is TL, and the focal length of the photographing optical lens assembly is f, the following condition is satisfied: 0.70<TL/f≤1.10. Therefore, it is favorable for obtaining high resolution of the partial image range and shortened total track length of the photographing optical lens assembly.

According to the photographing optical lens assembly of the present disclosure, the lens elements thereof can be made of glass or plastic materials. When the lens elements are made of glass materials, the distribution of the refractive power of the photographing optical lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced.

According to the photographing optical lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, the image surface of the photographing optical lens assembly, based on the corresponding image sensor, can be flat or curved. In particular, the image surface can be a curved surface being concave facing towards the object side.

According to the photographing optical lens assembly of the present disclosure, an aperture stop can be configured as a middle stop. A middle stop disposed between the first lens element and the image surface is favorable for enlarging the field of view of the photographing optical lens assembly and thereby provides a wider field of view for the same.

According to the photographing optical lens assembly of the present disclosure, a non-axial point is a critical point of the lens surface where its tangent is perpendicular to an optical axis.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. By the arrangement of the aforementioned photographing optical lens assembly, the first lens element has positive refractive power and the sixth lens element includes inflection point, so that the main converging ability of the incident light can be provided, so that the volume of the photographing optical lens assembly can be effectively reduced so as to satisfy the demand of compact size. Further, aberrations in the off-axial region can be corrected and the back focal length can be reduced so as to obtain the balance between the image quality and the volume. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-14th specific embodiments are provided for further explanation.

1st Embodiment

Figure 2:
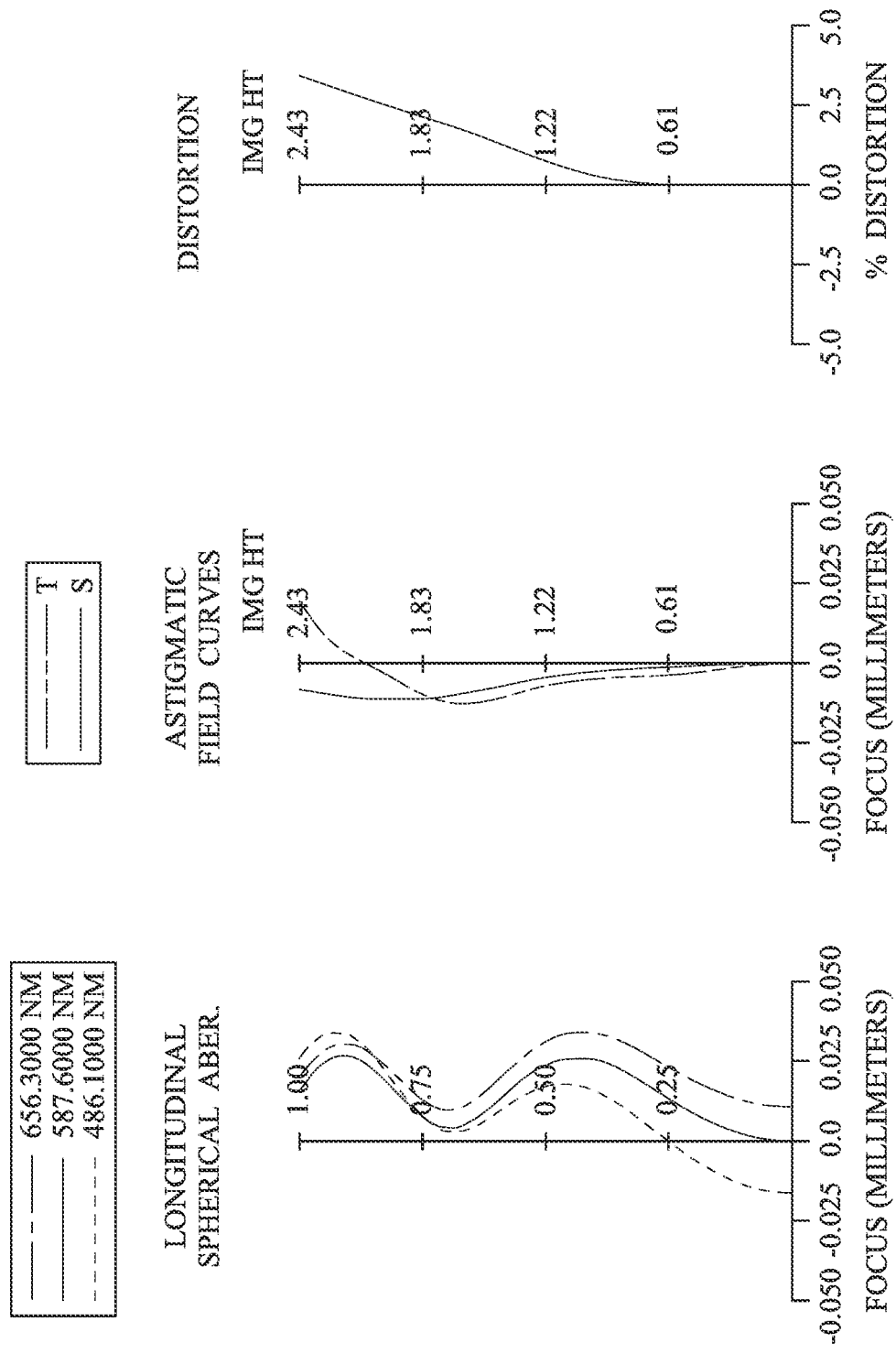
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing optical lens assembly (its reference numeral is omitted) and an image sensor 195. The photographing optical lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190, wherein the image sensor 195 is disposed on the image surface 190 of the photographing optical lens assembly. The photographing optical lens assembly has a total of seven lens elements (110-170).

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric. Furthermore, the image-side surface 142 of the fourth lens element 140 includes at least one inflection point.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one inflection point.

The seventh lens element 170 with positive refractive power has an object-side surface 171 being concave in a paraxial region thereof and an image-side surface 172 being convex in a paraxial region thereof. The seventh lens element 170 is made of a plastic material, and has the object-side surface 171 and the image-side surface 172 being both aspheric.

The IR-cut filter 180 is made of a glass material and located between the seventh lens element 170 and the image surface 190, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1-(1+k)\times(Y/R)^2)) + \sum_i (Ai)\times(Y^i),$$

where,
- X is the relative distance between a point on the aspheric surface spaced at a distance Y from the optical axis and the tangential plane at the aspheric surface vertex on the optical axis;
- Y is the vertical distance from the point on the aspheric surface to the optical axis;
- R is the curvature radius;
- k is the conic coefficient; and
- Ai is the i-th aspheric coefficient.

In the photographing optical lens assembly according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=6.17 mm; Fno=2.40; and HFOV=20.8 degrees.

In the photographing optical lens assembly according to the 1st embodiment, when an Abbe number of the seventh lens element 170 is V7, the following condition is satisfied: V7=23.5.

In the photographing optical lens assembly according to the 1st embodiment, when a curvature radius of the object-side surface 111 of the first lens element 110 is R1, and a central thickness of the first lens element 110 is CT1, the following condition is satisfied: R1/CT1=1.51.

In the photographing optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, and a sum of axial distances between every two of the lens elements of the photographing optical lens assembly that are adjacent to each other is ΣAT (that is, ΣAT=T12+T23+T34+T45+T56+T67), the following condition is satisfied: T56/(ΣAT−T56)=0.68.

In the photographing optical lens assembly according to the 1st embodiment, when the focal length of the photographing optical lens assembly is f, the curvature radius of the object-side surface 111 of the first lens element 110 is R1, and a curvature radius of the image-side surface 172 of the seventh lens element 170 is R14, the following conditions are satisfied: f/R1=3.79; and f/R14=−0.28.

In the photographing optical lens assembly according to the 1st embodiment, when a focal length of the sixth lens element 160 is f6, and a focal length of the seventh lens element 170 is f7, the following condition is satisfied: f6/f7=−0.07.

In the photographing optical lens assembly according to the 1st embodiment, when the focal length of the photographing optical lens assembly is f, and a focal length of the fourth lens element 140 is f4, the following condition is satisfied: |f/f4|=0.06.

In the photographing optical lens assembly according to the 1st embodiment, when a refractive power of the first lens element 110 is P1 (which is f/f1, a ratio value of the focal length of the photographing optical lens assembly f and the focal length of the first lens element f1), a refractive power of the second lens element 120 is P2 (which is f/f2, a ratio value of the focal length of the photographing optical lens assembly f and the focal length of the second lens element f2), a refractive power of the third lens element 130 is P3 (which is f/f3, a ratio value of the focal length of the photographing optical lens assembly f and the focal length of the third lens element f3), a refractive power of the fourth lens element 140 is P4 (which is f/f4, a ratio value of the focal length of the photographing optical lens assembly f and the focal length of the fourth lens element f4), a refractive power of the fifth lens element 150 is P5 (which is f/f5, a ratio value of the focal length of the photographing optical lens assembly f and the focal length of the fifth lens element f5), a refractive power of the sixth lens element 160 is P6 (which is f/f6, a ratio value of the focal length of the photographing optical lens assembly f and the focal length of the sixth lens element f6), and a refractive power of the seventh lens element 170 is P7 (which is f/f7, a ratio value of the focal length of the photographing optical lens assembly f and the focal length of the seventh lens element f7), the following condition is satisfied: (|P3|+|P4|+|P5|+|P7|)/(|P1|+|P2|+|P6|)=0.06.

Figure 23:
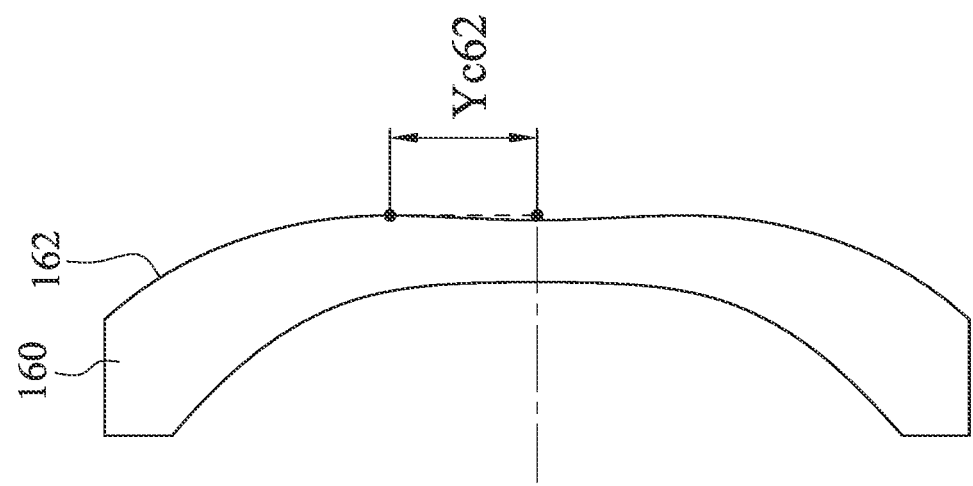
FIG. 23 shows a schematic view of a parameter Yc62 according to the 1st embodiment of FIG. 1.

FIG. 23 shows a schematic view of a parameter Yc62 according to the 1st embodiment of FIG. 1. In FIG. 23, when a vertical distance between a non-axial critical point on the image-side surface 162 of the sixth lens element 160 and an optical axis is Yc62, and a central thickness of the sixth lens element 160 is CT6, the following condition is satisfied: Yc62/CT6=2.32.

Figure 24:
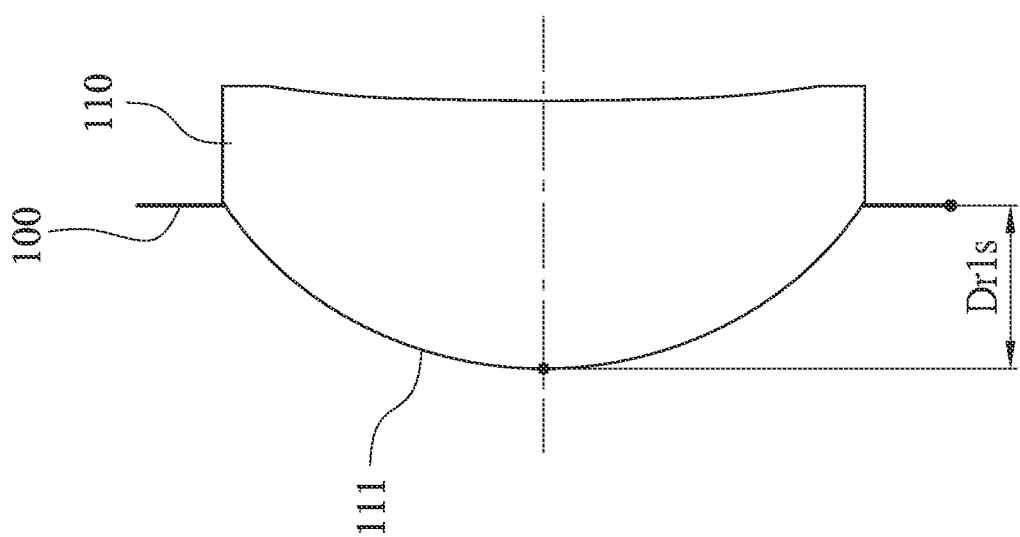
FIG. 24 shows a schematic view of a parameter Dr1s according to the 1st embodiment of FIG. 1.

FIG. 24 shows a schematic view of a parameter Dr1s according to the 1st embodiment of FIG. 1. In FIG. 24, when an axial distance between the object-side surface 111 of the first lens element 110 and the aperture stop 100 is Dr1s, and a central thickness of the second lens element 120 is CT2, the following condition is satisfied: |Dr1s|/CT2=2.99.

In the photographing optical lens assembly according to the 1st embodiment, when an axial distance between the object-side surface 111 of the first lens element 110 and the image surface 190 is TL, and a focal length of the photographing optical lens assembly is f, the following condition is satisfied: TL/f=1.00.

In the photographing optical lens assembly according to the 1st embodiment, when the focal length of the photographing optical lens assembly is f, and a maximal image height of the photographing optical lens assembly is ImgH (half of a diagonal length of an effective photosensitive area of the image sensor 195), the following condition is satisfied: f/ImgH=2.54.

Figure 25:
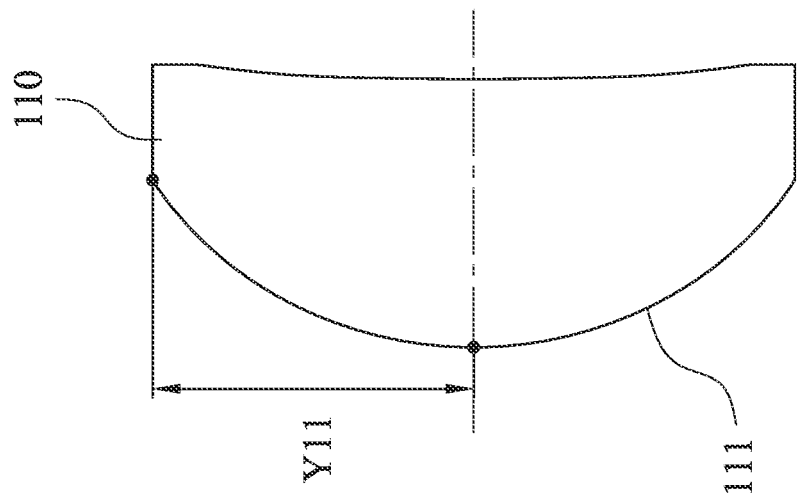
FIG. 25 shows a schematic view of a parameter Y11 according to the 1st embodiment of FIG. 1.

FIG. 25 shows a schematic view of a parameter Y11 according to the 1st embodiment of FIG. 1. In FIG. 25, when a maximal optical effective radius of the object-side surface 111 of the first lens element 110 is Y11, and the maximal image height of the photographing optical lens assembly is ImgH, the following condition is satisfied: Y11/ImgH=0.53.

In the photographing optical lens assembly according to the 1st embodiment, when an axial distance between the image-side surface 172 of the seventh lens element 170 and the image surface 190 is BL, and the maximal image height of the photographing optical lens assembly is ImgH, the following condition is satisfied: BL/ImgH=0.28.

The detailed optical data of the 1st embodiment are shown in Table 1 and the aspheric surface data are shown in Table 2 below.

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the 1st embodiment, among the first lens element 110, the second lens element 120, the third lens element 130, the fourth lens element 140, the fifth lens element 150, the sixth lens element 160 and the seventh lens

TABLE 1

1st Embodiment
f = 6.17 mm, Fno = 2.40, HFOV = 20.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.658 | | | | |
| 2 | Lens 1 | 1.627 | ASP | 1.080 | Plastic | 1.544 | 56.0 | 3.25 |
| 3 | | 15.863 | ASP | 0.158 | | | | |
| 4 | Lens 2 | 15.023 | ASP | 0.220 | Plastic | 1.639 | 23.5 | −5.59 |
| 5 | | 2.868 | ASP | 0.398 | | | | |
| 6 | Lens 3 | 9.402 | ASP | 0.364 | Plastic | 1.544 | 56.0 | 75.46 |
| 7 | | 12.029 | ASP | 0.277 | | | | |
| 8 | Lens 4 | −11.303 | ASP | 0.497 | Plastic | 1.639 | 23.5 | 95.49 |
| 9 | | −9.699 | ASP | 0.056 | | | | |
| 10 | Lens 5 | −10.442 | ASP | 0.638 | Plastic | 1.639 | 23.5 | −3623.55 |
| 11 | | −10.739 | ASP | 0.728 | | | | |
| 12 | Lens 6 | −11.380 | ASP | 0.250 | Plastic | 1.544 | 56.0 | −5.82 |
| 13 | | 4.417 | ASP | 0.175 | | | | |
| 14 | Lens 7 | −36.851 | ASP | 0.643 | Plastic | 1.639 | 23.5 | 81.37 |
| 15 | | −21.707 | ASP | 0.300 | | | | |
| 16 | IR-cut filter | Plano | | 0.210 | Glass | 1.517 | 64.2 | — |
| 17 | | Plano | | 0.167 | | | | |
| 18 | Image | Plano | | — | | | | |

Reference wavelength is 587.6 nm (d-line).

TABLE 2

Aspheric Coefficients

| Surface # | 2 | 3 | 4 | 5 | 6 | 7 | 8 |
|---|---|---|---|---|---|---|---|
| k = | −1.0386E−01 | 8.9967E+01 | −7.3778E+01 | −1.6312E+00 | 3.4735E+01 | 4.8544E+01 | 8.0225E+01 |
| A4 = | 5.3232E−03 | −2.2658E−02 | −1.0686E−01 | −4.6145E−02 | −1.0251E−02 | −2.6165E−02 | −3.4636E−02 |
| A6 = | −3.6531E−03 | −9.2838E−03 | 1.9523E−01 | 2.7362E−01 | 6.4442E−02 | 5.1237E−02 | 7.2759E−03 |
| A8 = | 1.4474E−02 | 2.0467E−01 | 1.2494E−01 | −6.5690E−02 | 1.2376E−01 | 6.0949E−02 | 9.9445E−03 |
| A10 = | −1.1366E−02 | −3.3364E−01 | −5.5251E−01 | −1.2478E−01 | −2.3471E−01 | −1.2296E−01 | −2.7364E−03 |
| A12 = | 4.2658E−03 | 2.3534E−01 | 4.9260E−01 | 7.5975E−02 | 1.5388E−01 | 8.6428E−02 | |
| A14 = | | −6.5551E−02 | −1.5826E−01 | | −3.8658E−02 | −2.5005E−02 | |

| Surface # | 9 | 10 | 11 | 12 | 13 | 14 | 15 |
|---|---|---|---|---|---|---|---|
| k = | −4.3662E+01 | −4.7885E+00 | 4.3254E+01 | 2.1460E+01 | 7.5009E−01 | 8.8441E+01 | 8.2867E+01 |
| A4 = | 1.3868E−02 | 1.5626E−02 | −1.5629E−02 | −1.6221E−01 | −1.9198E−01 | −9.4455E−02 | −8.5577E−02 |
| A6 = | 1.0986E−03 | 4.2101E−03 | 2.3887E−03 | −3.2820E−02 | 4.0272E−02 | 9.6827E−02 | 7.3228E−02 |
| A8 = | 1.2111E−03 | −9.6101E−05 | 3.0543E−03 | 7.8243E−02 | 3.1591E−02 | −4.9012E−02 | −3.2148E−02 |
| A10 = | 1.4658E−04 | 3.8246E−04 | 4.5234E−04 | −3.5566E−02 | −2.7562E−02 | 1.3964E−02 | 8.0531E−03 |
| A12 = | | | | 3.2525E−03 | 8.8240E−03 | −2.3348E−03 | −1.1667E−03 |
| A14 = | | | | 1.6709E−03 | −1.3737E−03 | 2.2331E−04 | 9.2268E−05 |
| A16 = | | | | −3.2376E−04 | 9.0138E−05 | −9.7154E−06 | −3.0738E−06 | element 170, at least one lens element with positive refractive power has an Abbe number which is smaller than 25. That is, the Abbe number of the fourth lens element 140 and the Abbe number of the seventh lens element 170 are smaller than 25.

2nd Embodiment

Figure 3:
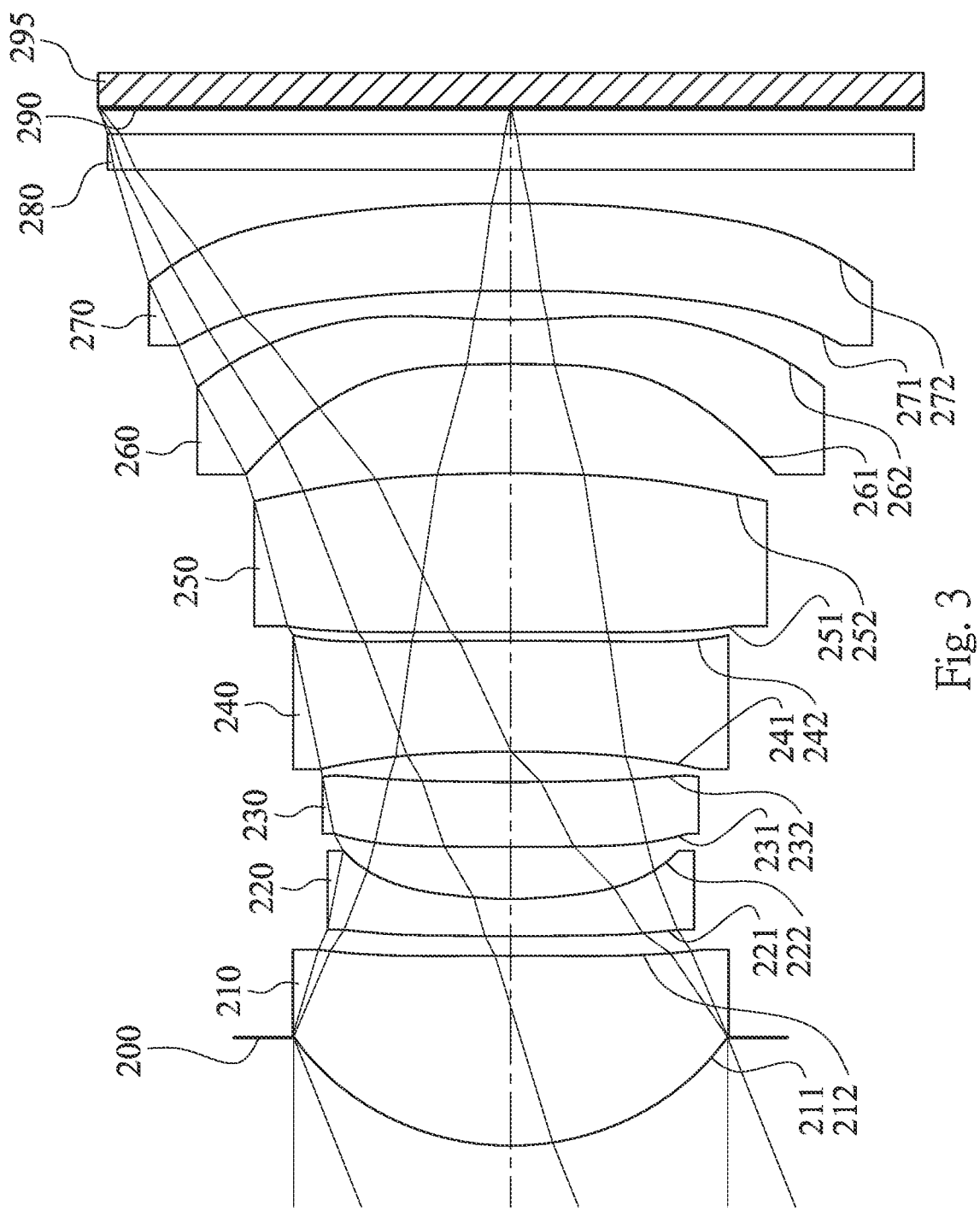
FIG. 3 is a schematic view of an image capturing device according to the 2nd embodiment of the present disclosure.
Figure 4:
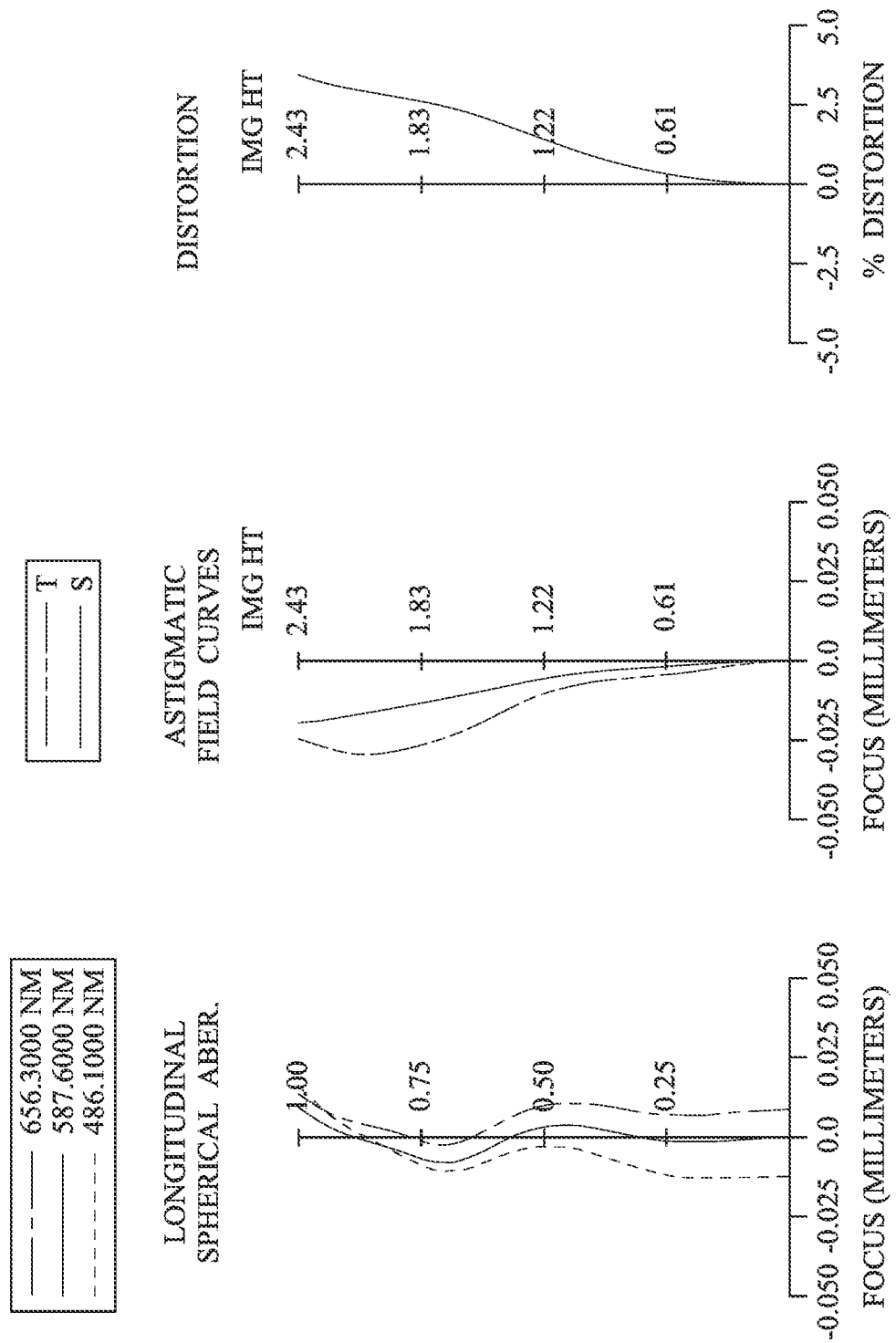
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing optical lens assembly (its reference numeral is omitted) and an image sensor 295. The photographing optical lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290, wherein the image sensor 295 is disposed on the image surface 290 of the photographing optical lens assembly. The photographing optical lens assembly has a total of seven lens elements (210-270).

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric. Furthermore, the image-side surface 242 of the fourth lens element 240 includes at least one inflection point.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one inflection point.

The seventh lens element 270 with positive refractive power has an object-side surface 271 being concave in a paraxial region thereof and an image-side surface 272 being convex in a paraxial region thereof. The seventh lens element 270 is made of a plastic material, and has the object-side surface 271 and the image-side surface 272 being both aspheric.

The IR-cut filter 280 is made of a glass material and located between the seventh lens element 270 and the image surface 290, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 5.89 mm, Fno = 2.30, HFOV = 21.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.639 | | | | |
| 2 | Lens 1 | 1.634 | ASP | 1.120 | Plastic | 1.544 | 56.0 | 3.02 |
| 3 | | 175.187 | ASP | 0.117 | | | | |
| 4 | Lens 2 | 15.805 | ASP | 0.220 | Plastic | 1.639 | 23.5 | −5.65 |
| 5 | | 2.920 | ASP | 0.306 | | | | |
| 6 | Lens 3 | 26.089 | ASP | 0.383 | Plastic | 1.544 | 56.0 | −68.07 |
| 7 | | 15.227 | ASP | 0.180 | | | | |
| 8 | Lens 4 | −10.643 | ASP | 0.655 | Plastic | 1.639 | 23.5 | −29.62 |
| 9 | | −24.919 | ASP | 0.052 | | | | |
| 10 | Lens 5 | −63.172 | ASP | 0.935 | Plastic | 1.583 | 30.2 | 24.29 |
| 11 | | −11.637 | ASP | 0.645 | | | | |
| 12 | Lens 6 | −14.640 | ASP | 0.261 | Plastic | 1.544 | 56.0 | −5.80 |
| 13 | | 4.049 | ASP | 0.171 | | | | |
| 14 | Lens 7 | −51.045 | ASP | 0.515 | Plastic | 1.639 | 23.5 | 66.49 |
| 15 | | −23.270 | ASP | 0.200 | | | | |
| 16 | IR-cut filter | Plano | | 0.210 | Glass | 1.517 | 64.2 | — |
| 17 | | Plano | | 0.153 | | | | |
| 18 | Image | Plano | | — | | | | |

Reference wavelength is 587.6 nm (d-line).

TABLE 4

Aspheric Coefficients

| Surface # | 2 | 3 | 4 | 5 | 6 | 7 | 8 |
|---|---|---|---|---|---|---|---|
| k = | −1.1170E−01 | 9.0000E+01 | −7.3778E+01 | −4.3908E+00 | −9.0000E+01 | 3.3937E+01 | 6.8985E+01 |
| A4 = | 7.1118E−03 | −1.3279E−02 | −1.0228E−01 | −5.4633E−02 | −2.6325E−02 | −2.4901E−02 | −3.1142E−02 |
| A6 = | −6.2390E−03 | −3.0305E−03 | 1.9558E−01 | 2.9085E−01 | 7.7658E−02 | 3.9355E−02 | 8.2221E−03 |
| A8 = | 1.4620E−02 | 1.9792E−01 | 1.3328E−01 | −6.2387E−01 | 1.2416E−01 | 6.4216E−02 | 4.2860E−03 |
| A10 = | −1.0119E−02 | −3.3418E−01 | −5.4973E−01 | −1.1875E−01 | −2.3898E−01 | −1.2873E−01 | −4.9774E−04 |
| A12 = | 3.4763E−03 | 2.3455E−01 | 4.8326E−01 | 8.6366E−02 | 1.5005E−01 | 7.8054E−02 | |
| A14 = | | −6.3038E−02 | −1.5111E−01 | | −3.8373E−02 | −2.4073E−02 | |

| Surface # | 9 | 10 | 11 | 12 | 13 | 14 | 15 |
|---|---|---|---|---|---|---|---|
| k = | −1.6766E+01 | 8.2704E+01 | 3.5947E+01 | 4.9847E+01 | 1.4468E+00 | −9.0000E+01 | 9.0000E+01 |
| A4 = | 1.3429E−02 | 5.2861E−03 | −1.9970E−02 | −1.5894E−01 | −1.9281E−01 | −9.5274E−02 | −7.4727E−02 |
| A6 = | 1.2215E−03 | 4.4770E−03 | 2.0401E−03 | −2.8627E−02 | 3.9930E−02 | 9.4441E−02 | 6.8192E−02 |
| A8 = | 9.8190E−04 | 1.1306E−03 | 1.5536E−03 | 7.8240E−02 | 3.2058E−02 | −4.9274E−02 | −3.2200E−02 |
| A10 = | 1.3405E−03 | −1.2579E−04 | −7.4957E−05 | −3.5285E−02 | −2.7472E−02 | 1.3949E−02 | 8.0756E−03 |
| A12 = | | | | 3.2490E−03 | 8.8365E−03 | −2.3331E−03 | −1.1629E−03 |
| A14 = | | | | 1.6216E−03 | −1.3765E−03 | 2.2428E−04 | 9.2500E−05 |
| A16 = | | | | −3.4136E−04 | 8.6760E−05 | −9.3757E−06 | −3.1172E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.89 | |f/f4| | 0.20 |
| Fno | 2.30 | (|P3| + |P4| + |P5| + |P7|)/ (|P1| + |P2| + |P6|) | 0.15 |
| HFOV [deg.] | 21.8 | Yc62/CT6 | 2.38 |
| V7 | 23.5 | |Dr1s|/CT2 | 2.90 |
| R1/CT1 | 1.46 | TL/f | 1.04 |
| T56/(ΣAT − T56) | 0.78 | f/ImgH | 2.42 |
| f/R1 | 3.60 | Y11/ImgH | 0.53 |
| f/R14 | −0.25 | BL/ImgH | 0.23 |
| f6/f7 | −0.09 | | |

Furthermore, in the 2nd embodiment, among the first lens element 210, the second lens element 220, the third lens element 230, the fourth lens element 240, the fifth lens element 250, the sixth lens element 260 and the seventh lens element 270, at least one lens element with positive refractive power has an Abbe number which is smaller than 25. That is, the Abbe number of the seventh lens element 270 is smaller than 25.

3rd Embodiment

Figure 5:
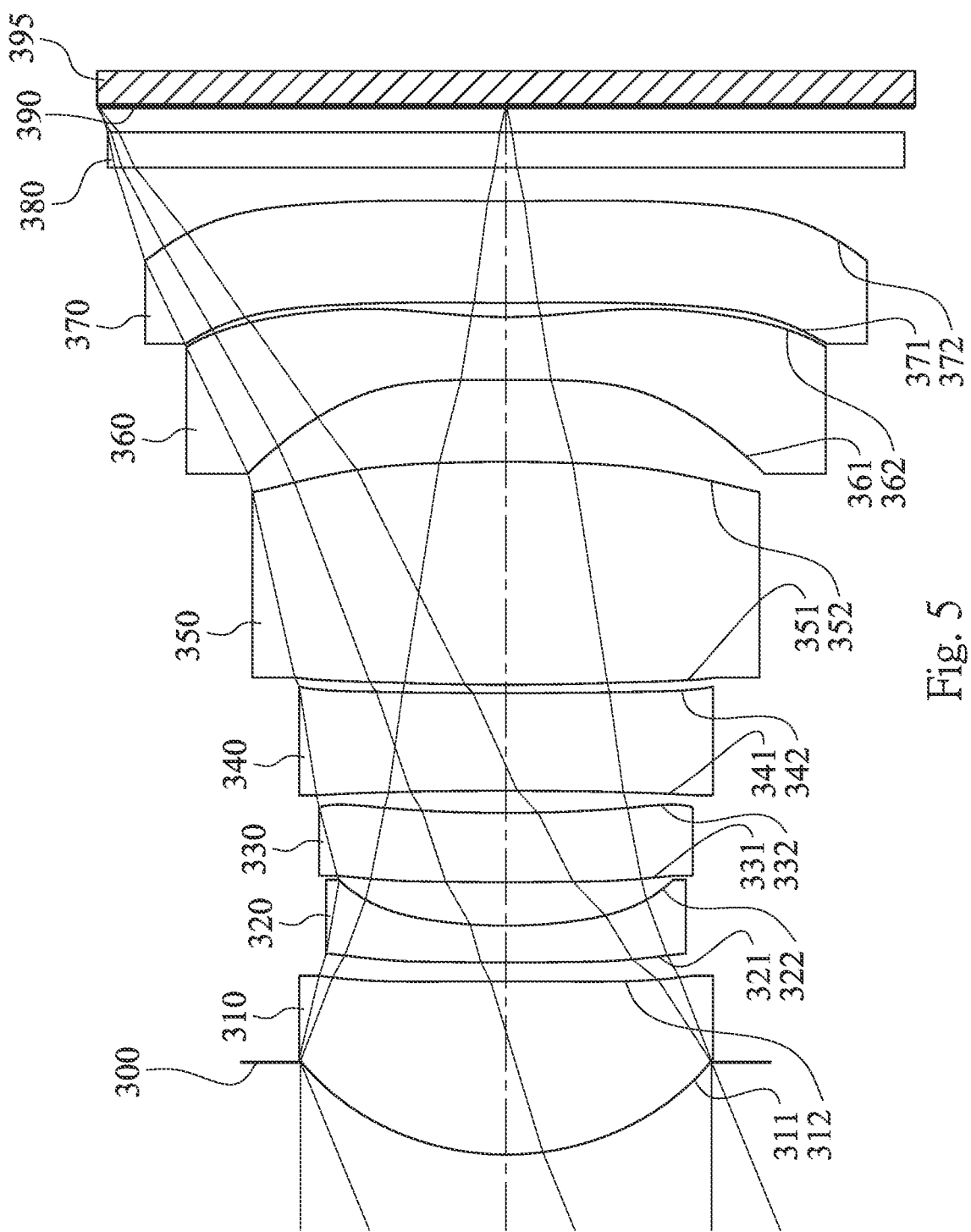
FIG. 5 is a schematic view of an image capturing device according to the 3rd embodiment of the present disclosure.
Figure 6:
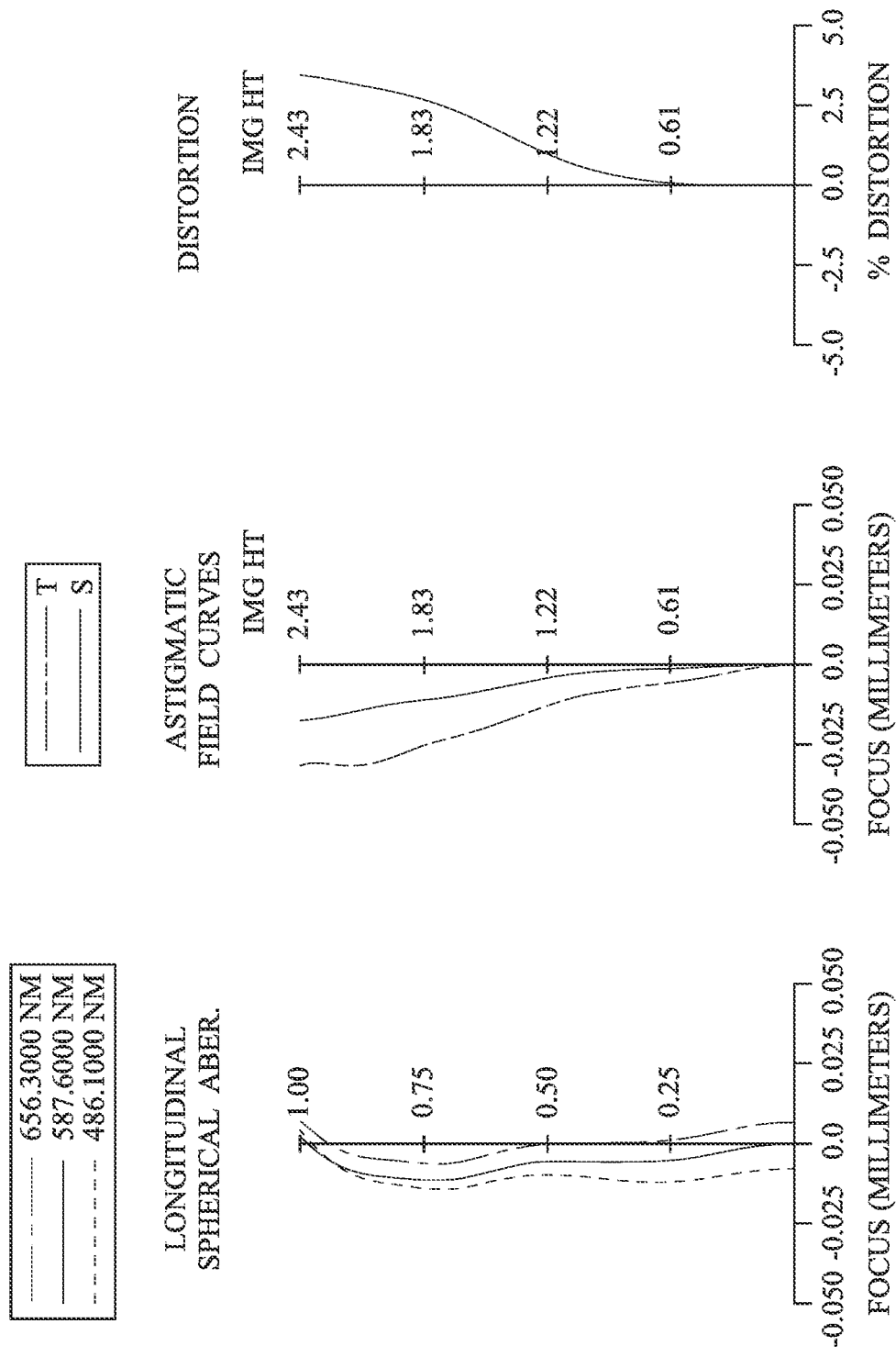
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes a photographing optical lens assembly (its reference numeral is omitted) and an image sensor 395. The photographing optical lens assembly includes, in order from an object side to an image side, an aperture stop 300, a first lens element 310, a second lens element 320, a third lens element 330, a fourth lens element 340, a fifth lens element 350, a sixth lens element 360, a seventh lens element 370, an IR-cut filter 380 and an image surface 390, wherein the image sensor 395 is disposed on the image surface 390 of the photographing optical lens assembly. The photographing optical lens assembly has a total of seven lens elements (310-370).

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of a plastic material, and has the object-side surface 361 and the image-side surface 362 being both aspheric.

Furthermore, the image-side surface 362 of the sixth lens element 360 includes at least one inflection point.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric.

The IR-cut filter 380 is made of a glass material and located between the seventh lens element 370 and the image surface 390, and will not affect the focal length of the photographing optical lens assembly.

The detailed optical data of the 3rd embodiment are shown in Table 5 and the aspheric surface data are shown in Table 6 below.

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.75 | \|f/f4\| | 0.16 |
| Fno | 2.35 | (\|P3\| + \|P4\| + \|P5\| + \|P7\|)/ (\|P1\| + \|P2\| + \|P6\|) | 0.21 |

TABLE 5

3rd Embodiment
f = 5.75 mm, Fno = 2.35, HFOV = 22.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.550 | | | | |
| 2 | Lens 1 | 1.675 | ASP | 1.031 | Plastic | 1.544 | 55.9 | 3.03 |
| 3 | | −89.251 | ASP | 0.112 | | | | |
| 4 | Lens 2 | 13.253 | ASP | 0.220 | Plastic | 1.639 | 23.5 | −5.78 |
| 5 | | 2.867 | ASP | 0.259 | | | | |
| 6 | Lens 3 | 19.803 | ASP | 0.412 | Plastic | 1.544 | 55.9 | −24.46 |
| 7 | | 7.902 | ASP | 0.132 | | | | |
| 8 | Lens 4 | −108.983 | ASP | 0.582 | Plastic | 1.660 | 20.4 | −34.85 |
| 9 | | 29.211 | ASP | 0.050 | | | | |
| 10 | Lens 5 | 13.490 | ASP | 1.328 | Plastic | 1.514 | 56.8 | 14.24 |
| 11 | | −15.441 | ASP | 0.489 | | | | |
| 12 | Lens 6 | −78.014 | ASP | 0.374 | Plastic | 1.514 | 56.8 | −5.56 |
| 13 | | 2.969 | ASP | 0.084 | | | | |
| 14 | Lens 7 | 16.547 | ASP | 0.606 | Plastic | 1.660 | 20.4 | −165.38 |
| 15 | | 14.159 | ASP | 0.200 | | | | |
| 16 | IR-cut filter | Plano | | 0.210 | Glass | 1.517 | 64.2 | — |
| 17 | | Plano | | 0.155 | | | | |
| 18 | Image | Plano | | — | | | | |

Reference wavelength is 587.6 nm (d-line).

TABLE 6

Aspheric Coefficients

| Surface # | 2 | 3 | 4 | 5 | 6 | 7 | 8 |
|---|---|---|---|---|---|---|---|
| k = | −9.2782E−02 | −9.0000E+01 | −7.3778E+01 | −6.9228E+00 | −2.3179E+01 | 2.1975E+01 | −9.0000E+01 |
| A4 = | 8.7125E−03 | −5.3104E−03 | −9.9997E−02 | −6.0818E−02 | −4.4294E−02 | −3.0941E−02 | −2.6123E−02 |
| A6 = | −5.4834E−03 | −2.0525E−03 | 1.9632E−01 | 2.9494E−01 | 7.3640E−02 | 2.9239E−02 | 1.1241E−02 |
| A8 = | 1.4027E−02 | 1.9304E−01 | 1.3670E−01 | −5.7259E−02 | 1.1698E−01 | 5.9661E−02 | 4.7749E−03 |
| A10 = | −9.6050E−03 | −3.3362E−01 | −5.4887E−01 | −1.3003E−01 | −2.4088E−01 | −1.3272E−01 | −4.2512E−03 |
| A12 = | 3.6229E−03 | 2.3879E−01 | 4.7763E−01 | 8.1992E−02 | 1.5426E−01 | 7.6131E−02 | |
| A14 = | | −6.5074E−02 | −1.4801E−01 | | −4.6144E−02 | −2.0880E−02 | |

| Surface # | 9 | 10 | 11 | 12 | 13 | 14 | 15 |
|---|---|---|---|---|---|---|---|
| k = | −9.0000E+01 | −7.3255E+01 | 6.0976E+01 | −9.0000E+01 | 3.2526E−01 | 5.6045E+01 | −9.0000E+01 |
| A4 = | −6.7893E−03 | −1.3151E−02 | −3.7885E−02 | −1.6601E−01 | −1.8399E−01 | −9.8927E−02 | −8.3537E−02 |
| A6 = | −6.0032E−04 | −2.2157E−03 | 5.0093E−03 | −3.2044E−02 | 3.9624E−02 | 9.2516E−02 | 6.9279E−02 |
| A8 = | 4.2243E−04 | 3.6867E−03 | 1.6701E−03 | 8.0621E−02 | 3.1846E−02 | −4.9314E−02 | −3.2218E−02 |
| A10 = | 3.7237E−03 | 1.2106E−03 | 3.0316E−05 | −3.4754E−02 | −2.7449E−02 | 1.3963E−02 | 8.0566E−03 |
| A12 = | | | | 3.1866E−03 | 8.8473E−03 | −2.3311E−03 | −1.1653E−03 |
| A14 = | | | | 1.5530E−03 | −1.3762E−03 | 2.2457E−04 | 9.2499E−05 |
| A16 = | | | | −3.5289E−04 | 8.5499E−05 | −9.2682E−06 | −3.0202E−06 |

-continued

| 3rd Embodiment | | | |
|---|---|---|---|
| HFOV [deg.] | 22.3 | Yc62/CT6 | 2.19 |
| V7 | 20.4 | \|Dr1s\|/CT2 | 2.50 |
| R1/CT1 | 1.62 | TL/f | 1.09 |
| T56/(ΣAT − T56) | 0.77 | f/ImgH | 2.36 |
| f/R1 | 3.43 | Y11/ImgH | 0.51 |
| f/R14 | 0.41 | BL/ImgH | 0.23 |
| f6/f7 | 0.03 | | |

4th Embodiment

Figure 7:
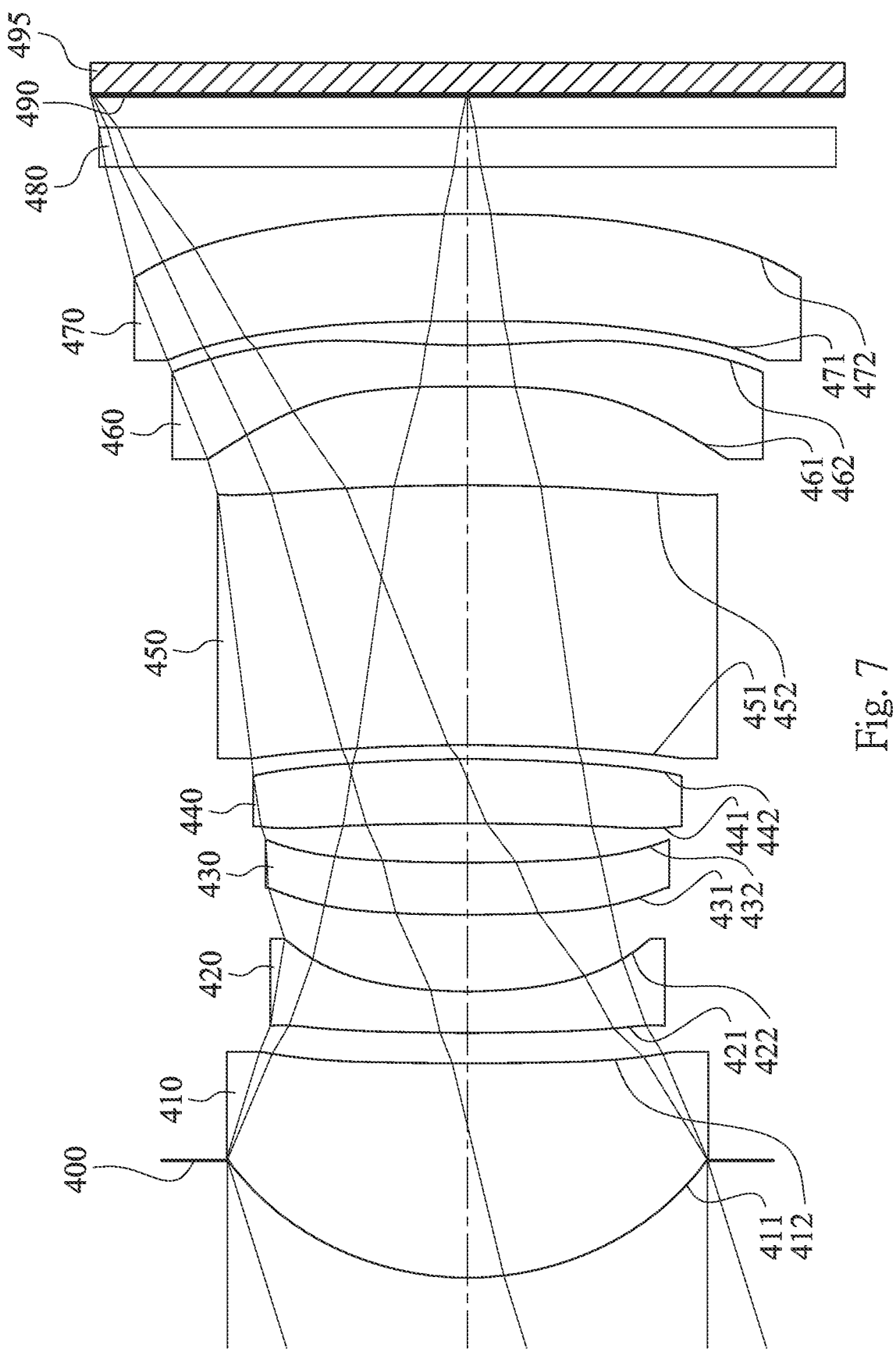
FIG. 7 is a schematic view of an image capturing device according to the 4th embodiment of the present disclosure.
Figure 8:
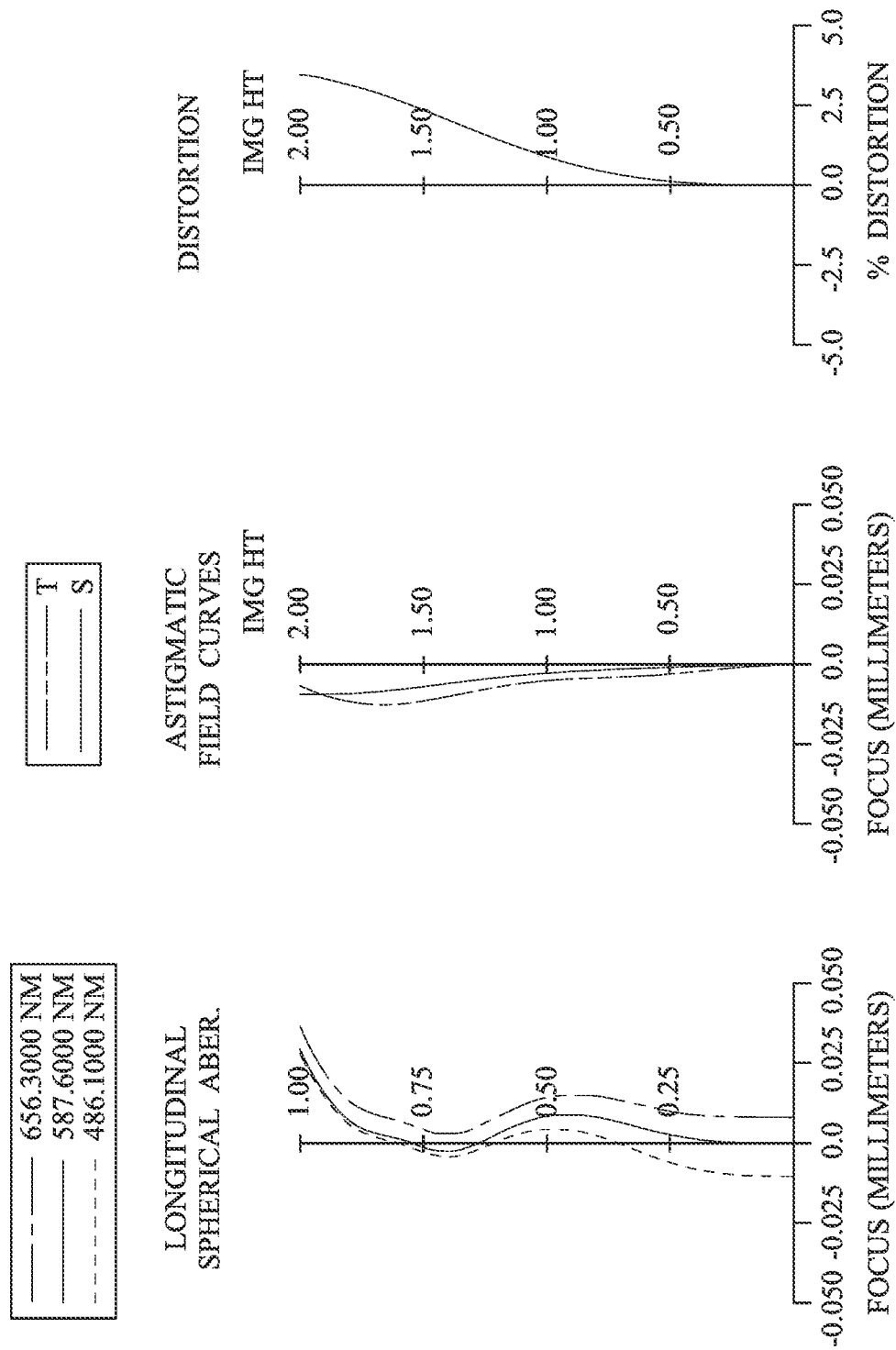
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing optical lens assembly (its reference numeral is omitted) and an image sensor 495. The photographing optical lens assembly includes, in order from an object side to an image side, an aperture stop 400, a first lens element 410, a second lens element 420, a third lens element 430, a fourth lens element 440, a fifth lens element 450, a sixth lens element 460, a seventh lens element 470, an IR-cut filter 480 and an image surface 490, wherein the image sensor 495 is disposed on the image surface 490 of the photographing optical lens assembly. The photographing optical lens assembly has a total of seven lens elements (410-470).

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes at least one inflection point.

The fifth lens element 450 with negative refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one inflection point.

The seventh lens element 470 with positive refractive power has an object-side surface 471 being concave in a paraxial region thereof and an image-side surface 472 being convex in a paraxial region thereof. The seventh lens element 470 is made of a plastic material, and has the object-side surface 471 and the image-side surface 472 being both aspheric.

The IR-cut filter 480 is made of a glass material and located between the seventh lens element 470 and the image surface 490, and will not affect the focal length of the photographing optical lens assembly.

The detailed optical data of the 4th embodiment are shown in Table 7 and the aspheric surface data are shown in Table 8 below.

TABLE 7

4th Embodiment
f = 6.14 mm, Fno = 2.40, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.626 | | | | |
| 2 | Lens 1 | 1.658 | ASP | 1.143 | Plastic | 1.544 | 55.9 | 3.27 |
| 3 | | 18.459 | ASP | 0.162 | | | | |
| 4 | Lens 2 | 10.137 | ASP | 0.221 | Plastic | 1.639 | 23.5 | −5.43 |
| 5 | | 2.562 | ASP | 0.409 | | | | |
| 6 | Lens 3 | 8.296 | ASP | 0.278 | Plastic | 1.544 | 55.9 | 147.80 |
| 7 | | 9.140 | ASP | 0.209 | | | | |
| 8 | Lens 4 | −22.557 | ASP | 0.343 | Plastic | 1.515 | 56.5 | 25.53 |
| 9 | | −8.346 | ASP | 0.075 | | | | |
| 10 | Lens 5 | −9.965 | ASP | 1.385 | Plastic | 1.639 | 23.5 | −47.89 |
| 11 | | −15.580 | ASP | 0.527 | | | | |
| 12 | Lens 6 | −11.655 | ASP | 0.220 | Plastic | 1.544 | 55.9 | −5.53 |
| 13 | | 4.081 | ASP | 0.128 | | | | |
| 14 | Lens 7 | −89.561 | ASP | 0.572 | Plastic | 1.639 | 23.5 | 38.29 |
| 15 | | −19.257 | ASP | 0.250 | | | | |
| 16 | IR-cut filter | Plano | | 0.210 | Glass | 1.517 | 64.2 | — |

TABLE 7-continued

4th Embodiment
f = 6.14 mm, Fno = 2.40, HFOV = 17.5 deg.

| Surface # | | Curvature Radius | Thickness | Material | Index | Abbe # | Focal Length |
|---|---|---|---|---|---|---|---|
| 17 | | Plano | 0.174 | | | | |
| 18 | Image | Plano | — | | | | |

Reference wavelength is 587.6 nm (d-line).

TABLE 8

Aspheric Coefficients

| Surface # | 2 | 3 | 4 | 5 | 6 | 7 | 8 |
|---|---|---|---|---|---|---|---|
| k = | −1.0876E−01 | 9.0000E+01 | −7.3778E+01 | −1.7184E+00 | 3.2928E+01 | 5.8938E+01 | −9.0000E+01 |
| A4 = | 6.3881E−03 | −1.9993E−02 | −1.0355E−01 | −4.6342E−02 | −1.1821E−02 | −2.4966E−02 | −2.8876E−02 |
| A6 = | −5.4449E−03 | −5.1561E−03 | 1.9674E−01 | 2.8592E−01 | 6.6552E−02 | 4.8491E−02 | 1.4085E−02 |
| A8 = | 1.5028E−02 | 2.0517E−01 | 1.2800E−01 | −6.4955E−01 | 1.2250E−01 | 6.5103E−02 | 8.9669E−03 |
| A10 = | −1.0600E−02 | −3.3532E−01 | −5.5308E−01 | −1.2908E−01 | −2.3644E−01 | −1.2279E−01 | −2.9797E−04 |
| A12 = | 3.6702E−03 | 2.3554E−01 | 4.8720E−01 | 6.8372E−02 | 1.5028E−01 | 8.4166E−02 | 2.5609E−03 |
| A14 = | | −6.4952E−02 | −1.5671E−01 | | −4.0064E−02 | −2.5850E−02 | −8.8732E−07 |

| Surface # | 9 | 10 | 11 | 12 | 13 | 14 | 15 |
|---|---|---|---|---|---|---|---|
| k = | −3.5090E+00 | 5.7860E+01 | 5.3515E+01 | −2.3048E+01 | 2.4639E+00 | −9.0000E+01 | 8.7644E+01 |
| A4 = | 5.7925E−03 | 7.7652E−03 | −1.2043E−02 | −1.4465E−01 | −1.7809E−01 | −1.0784E−01 | −8.8005E−02 |
| A6 = | −5.0037E−03 | 2.5649E−03 | 2.6457E−03 | −2.6528E−02 | 3.9035E−02 | 9.5724E−02 | 7.0134E−02 |
| A8 = | −7.4716E−04 | −1.1179E−03 | 3.0671E−03 | 7.9350E−02 | 3.1721E−02 | −4.9281E−02 | −3.2158E−02 |
| A10 = | −1.0889E−03 | −1.5413E−04 | 3.6669E−04 | −3.5411E−02 | −2.7526E−02 | 1.3939E−02 | 8.0717E−03 |
| A12 = | −7.5758E−04 | 2.9055E−04 | −1.9339E−05 | 3.2380E−03 | 8.8173E−03 | −2.3315E−03 | −1.1650E−03 |
| A14 = | −3.0188E−04 | 1.4403E−04 | 5.4237E−05 | 1.6363E−03 | −1.3804E−03 | 2.2581E−04 | 9.2009E−05 |
| A16 = | | | | −3.5363E−04 | 8.6976E−05 | −8.9058E−06 | −3.2249E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.14 | $|f/f4|$ | 0.24 |
| Fno | 2.40 | $(|P3| + |P4| + |P5| + |P7|)/$ | 0.14 |
| | | $(|P1| + |P2| + |P6|)$ | |
| HFOV [deg.] | 17.5 | Yc62/CT6 | 3.00 |
| V7 | 23.5 | $|Dr1s|/CT2$ | 2.83 |
| R1/CT1 | 1.45 | TL/f | 1.03 |
| T56/(ΣAT − T56) | 0.54 | f/ImgH | 3.07 |
| f/R1 | 3.70 | Y11/ImgH | 0.64 |
| f/R14 | −0.32 | BL/ImgH | 0.32 |
| f6/f7 | −0.14 | | |

Furthermore, in the 4th embodiment, among the first lens element 410, the second lens element 420, the third lens element 430, the fourth lens element 440, the fifth lens element 450, the sixth lens element 460 and the seventh lens element 470, at least one lens element with positive refractive power has an Abbe number which is smaller than 25. That is, the Abbe number of the seventh lens element 470 is smaller than 25.

5th Embodiment

Figure 9:
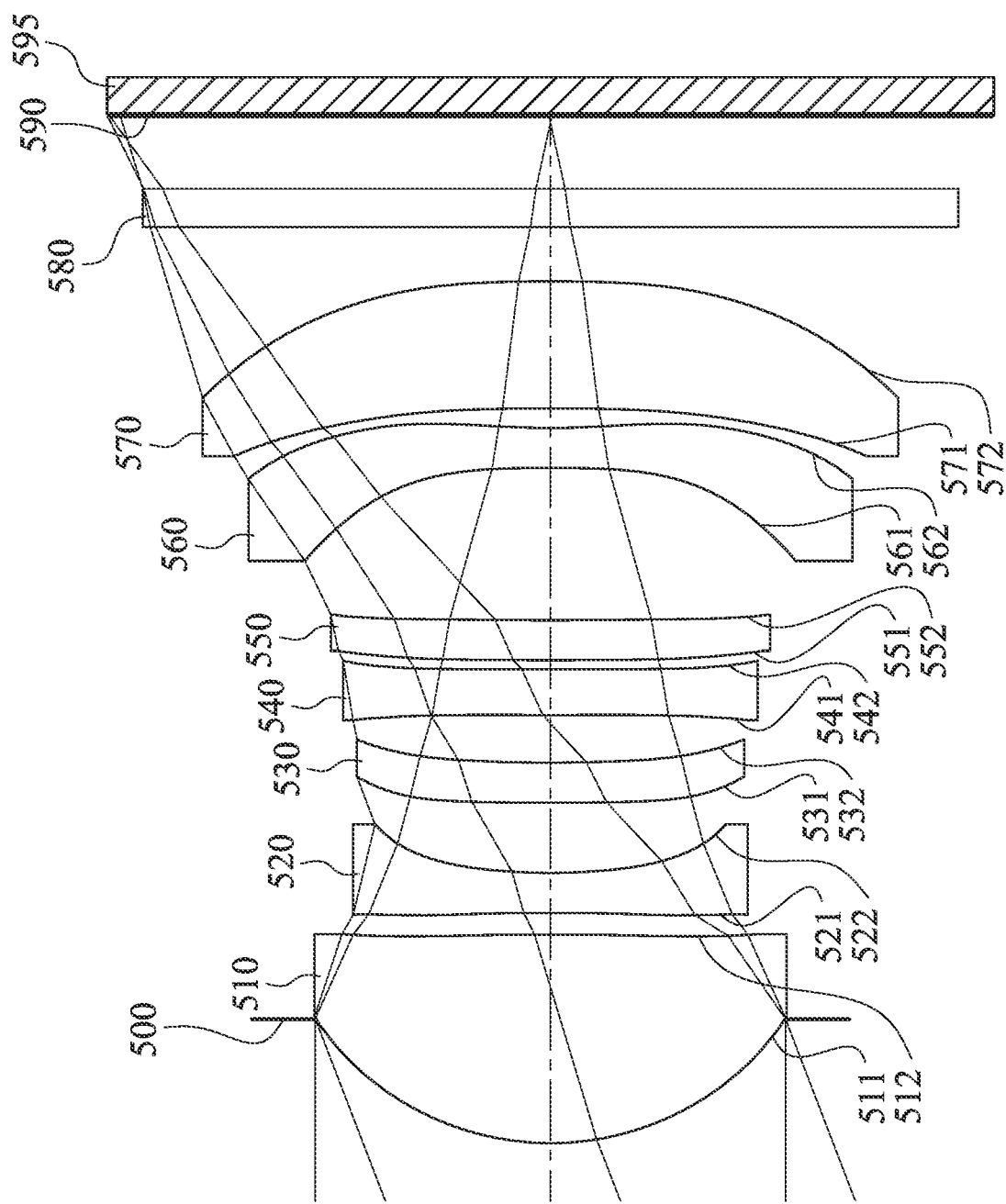
FIG. 9 is a schematic view of an image capturing device according to the embodiment of the present disclosure.
Figure 10:
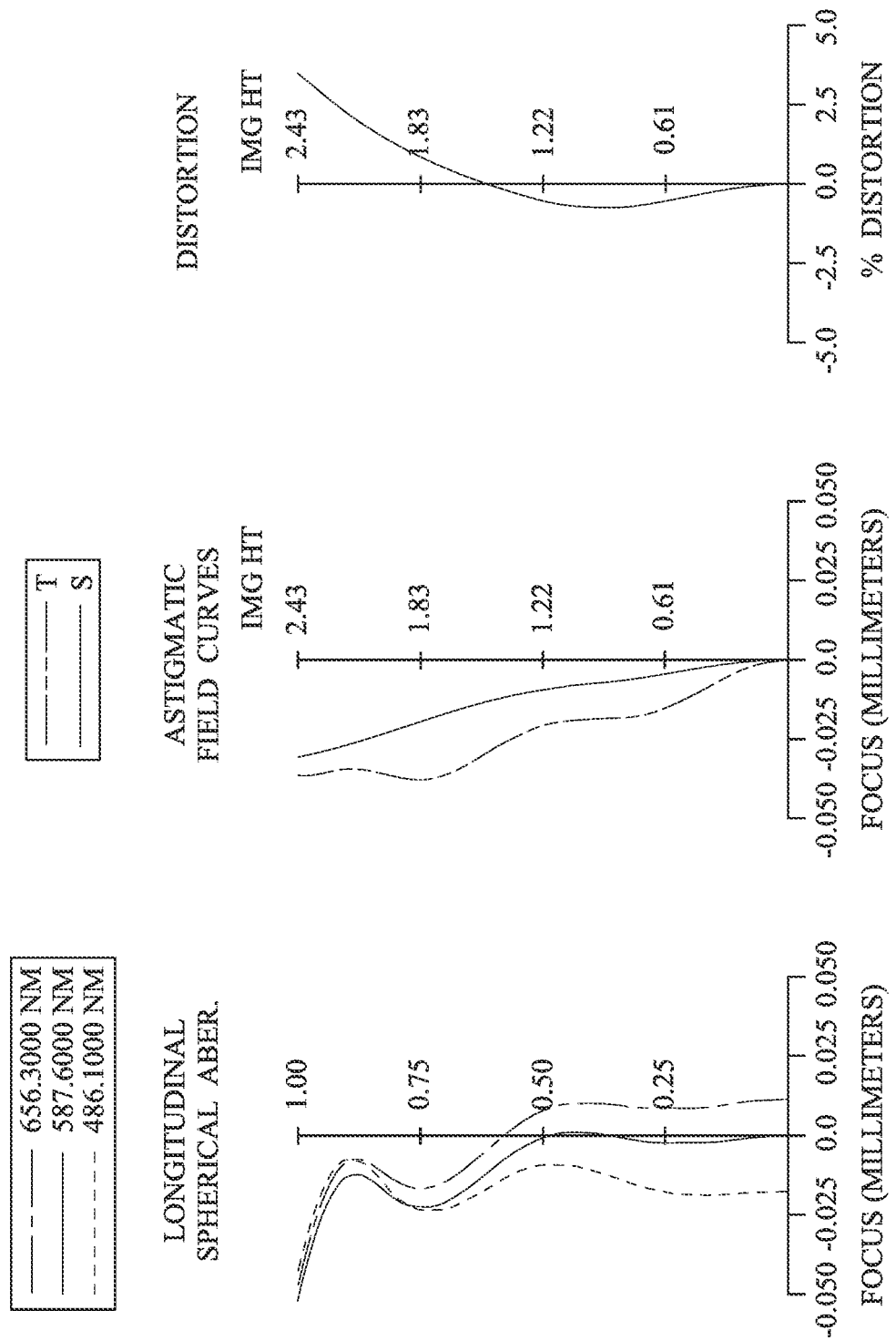
FIG. 10 shows spherical aberration curves, astigmatic field curves and a distortion curve of the image capturing device according to the 5th embodiment.

FIG. 9 is a schematic view of an image capturing device according to the embodiment of the present disclosure. FIG. 10 shows spherical aberration curves, astigmatic field curves and a distortion curve of the image capturing device according to the 5th embodiment. In FIG. 9, the image capturing device includes a photographing optical lens assembly (its reference numeral is omitted) and an image sensor 595. The photographing optical lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 580 and an image surface 590, wherein the image sensor 595 is disposed on the image surface 590 of the photographing optical lens assembly. The photographing optical lens assembly has a total of seven lens elements (510-570).

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of a plastic material, and has the object-side surface 541 and the image-side surface 542 being both aspheric. Furthermore, each of the object-side surface 541 and the image-side surface 542 of the fourth lens element 540 includes at least one inflection point.

The fifth lens element 550 with negative refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one inflection point.

The seventh lens element 570 with positive refractive power has an object-side surface 571 being concave in a paraxial region thereof and an image-side surface 572 being convex in a paraxial region thereof. The seventh lens element 570 is made of a plastic material, and has the object-side surface 571 and the image-side surface 572 being both aspheric.

The IR-cut filter 580 is made of a glass material and located between the seventh lens element 570 and the image surface 590, and will not affect the focal length of the photographing optical lens assembly.

The detailed optical data of the 5th embodiment are shown in Table 9 and the aspheric surface data are shown in Table 10 below.

TABLE 9

5th Embodiment
f = 6.14 mm, Fno = 2.38, HFOV = 21.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.682 | | | | |
| 2 | Lens 1 | 1.569 ASP | 1.146 | Plastic | 1.544 | 56.0 | 2.77 |
| 3 | | −28.534 ASP | 0.119 | | | | |
| 4 | Lens 2 | −29.021 ASP | 0.220 | Plastic | 1.639 | 23.5 | −4.43 |
| 5 | | 3.145 ASP | 0.386 | | | | |
| 6 | Lens 3 | 19.669 ASP | 0.220 | Plastic | 1.544 | 56.0 | −27.69 |
| 7 | | 8.498 ASP | 0.262 | | | | |
| 8 | Lens 4 | 38.821 ASP | 0.251 | Plastic | 1.639 | 23.5 | 56.37 |
| 9 | | −493.736 ASP | 0.050 | | | | |
| 10 | Lens 5 | 41.278 ASP | 0.220 | Plastic | 1.639 | 23.5 | −239.94 |
| 11 | | 32.450 ASP | 0.837 | | | | |
| 12 | Lens 6 | −10.664 ASP | 0.220 | Plastic | 1.544 | 56.0 | −5.47 |
| 13 | | 4.153 ASP | 0.106 | | | | |
| 14 | Lens 7 | −59.542 ASP | 0.699 | Plastic | 1.639 | 23.5 | 33.90 |
| 15 | | −15.950 ASP | 0.300 | | | | |
| 16 | IR-cut filter | Plano | 0.210 | Glass | 1.517 | 64.2 | — |
| 17 | | Plano | 0.404 | | | | |
| 18 | Image | Plano | — | | | | |

Reference wavelength is 587.6 nm (d-line).

TABLE 10

Aspheric Coefficients

| Surface # | 2 | 3 | 4 | 5 | 6 | 7 | 8 |
|---|---|---|---|---|---|---|---|
| k = | −1.2365E−01 | 3.2180E+01 | −7.3778E+01 | −2.1902E+00 | 8.8977E+01 | 4.4102E+01 | −9.0000E+01 |
| A4 = | 5.8271E−03 | −1.9868E−02 | −1.0468E−01 | −4.8086E−02 | −9.1784E−03 | −1.7954E−02 | −3.8648E−02 |
| A6 = | −6.3763E−03 | −6.3534E−03 | 1.9687E−01 | 2.8022E−01 | 8.1007E−02 | 4.8278E−02 | 8.2441E−05 |
| A8 = | 1.4323E−02 | 2.0386E−01 | 1.3133E−01 | −6.2654E−02 | 1.3123E−01 | 6.5309E−02 | 5.2653E−03 |
| A10 = | −1.0639E−02 | −3.3696E−01 | −5.4802E−01 | −1.0740E−01 | −2.3367E−01 | −1.2345E−01 | −3.0718E−04 |
| A12 = | 3.6856E−03 | 2.3524E−01 | 4.8783E−01 | 9.6195E−02 | 1.5277E−01 | 8.3907E−02 | 1.6370E−03 |
| A14 = | | −6.2900E−02 | −1.5267E−01 | | −3.9541E−02 | −2.5082E−02 | −9.2505E−04 |

TABLE 10-continued

Aspheric Coefficients

| Surface # | 9 | 10 | 11 | 12 | 13 | 14 | 15 |
|---|---|---|---|---|---|---|---|
| k = | −4.5000E+01 | −9.0000E+01 | 7.9480E+01 | 3.3324E+01 | 1.3847E+00 | −1.1375E+01 | 5.6056E+01 |
| A4 = | 1.6073E−02 | 1.4331E−02 | −1.2330E−02 | −1.6250E−01 | −1.7995E−01 | −1.1048E−01 | −1.1876E−01 |
| A6 = | 5.5496E−03 | 2.8971E−03 | 5.7542E−03 | −3.3733E−02 | 3.7540E−02 | 9.6567E−02 | 7.4522E−02 |
| A8 = | 2.3053E−03 | 5.1482E−04 | 4.0339E−03 | 7.8941E−02 | 3.1167E−02 | −4.8955E−02 | −3.2021E−02 |
| A10 = | 2.4061E−04 | 7.4312E−04 | 5.4569E−04 | −3.5880E−02 | −2.7507E−02 | 1.3969E−02 | 8.0596E−03 |
| A12 = | 9.1951E−06 | 1.7063E−05 | −1.6016E−04 | 2.9813E−03 | 8.8434E−03 | −2.3342E−03 | −1.1666E−03 |
| A14 = | 4.7156E−04 | −4.3989E−04 | −2.0317E−04 | 1.6142E−03 | −1.3755E−03 | 2.2344E−04 | 9.2160E−05 |
| A16 = | | | | −2.7677E−04 | 8.6482E−05 | −9.6525E−06 | −3.1195E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.14 | |f/f4| | 0.11 |
| Fno | 2.38 | (|P3| + |P4| + |P5| + |P7|)/ (|P1| + |P2| + |P6|) | 0.11 |
| HFOV [deg.] | 21.0 | Yc62/CT6 | 2.91 |
| V7 | 23.5 | |Dr1s|/CT2 | 3.10 |
| R1/CT1 | 1.37 | TL/f | 0.92 |
| T56/(ΣAT − T56) | 0.91 | f/ImgH | 2.52 |
| f/R1 | 3.91 | Y11/ImgH | 0.53 |
| f/R14 | −0.39 | BL/ImgH | 0.38 |
| f6/f7 | −0.16 | | |

Furthermore, in the 5th embodiment, among the first lens element 510, the second lens element 520, the third lens element 530, the fourth lens element 540, the fifth lens element 550, the sixth lens element 560 and the seventh lens element 570, at least one lens element with positive refractive power has an Abbe number which is smaller than 25. That is, both of the Abbe number of the fourth lens element 540 and the Abbe number of the seventh lens element 570 are smaller than 25.

6th Embodiment

Figure 11:
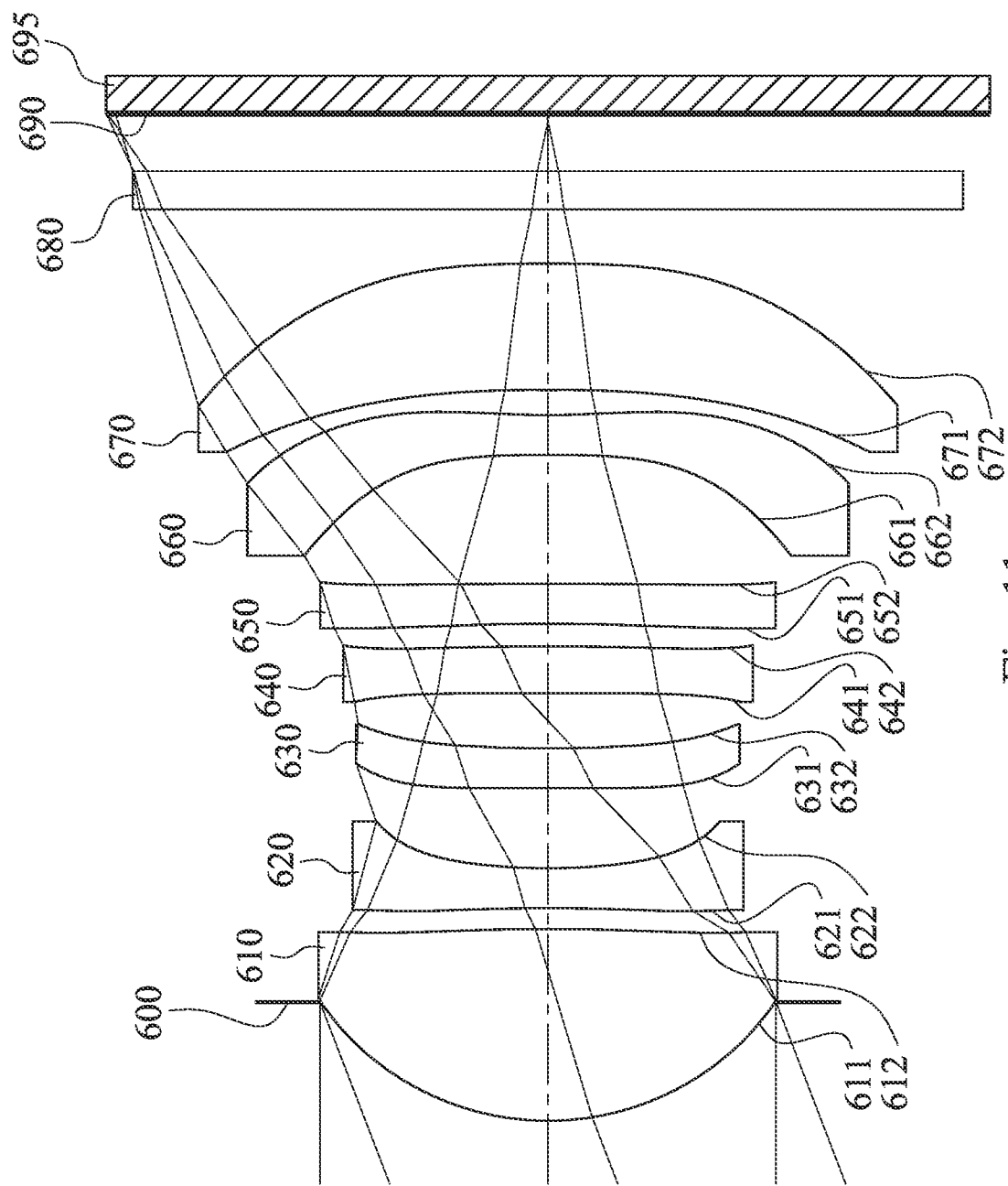
FIG. 11 is a schematic view of an image capturing device according to the 6th embodiment of the present disclosure.
Figure 12:
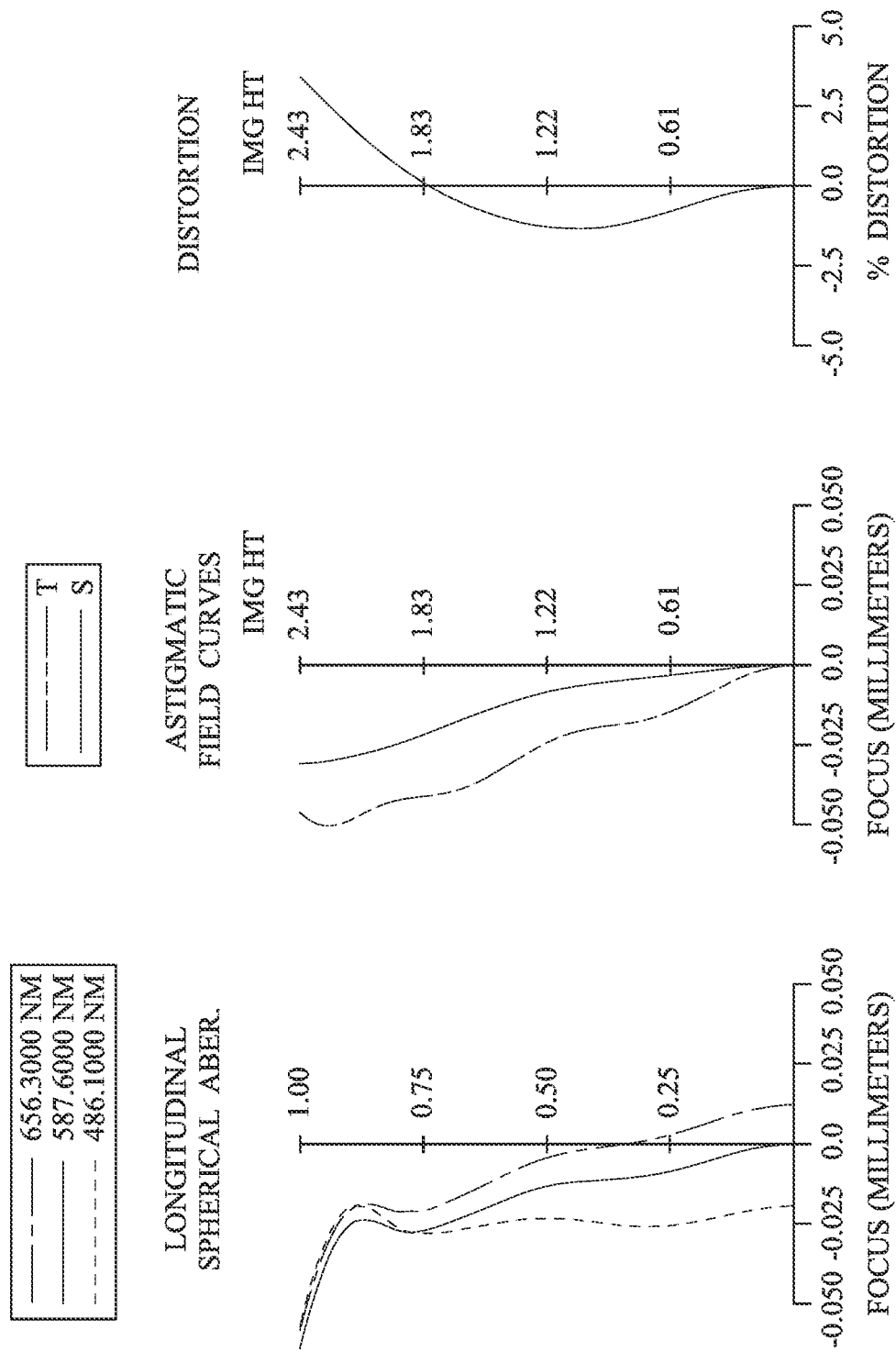
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing optical lens assembly (its reference numeral is omitted) and an image sensor 695. The photographing optical lens assembly includes, in order from an object side to an image side, an aperture stop 600, a first lens element 610, a second lens element 620, a third lens element 630, a fourth lens element 640, a fifth lens element 650, a sixth lens element 660, a seventh lens element 670, an IR-cut filter 680 and an image surface 690, wherein the image sensor 695 is disposed on the image surface 690 of the photographing optical lens assembly. The photographing optical lens assembly has a total of seven lens elements (610-670).

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of a plastic material, and has the object-side surface 641 and the image-side surface 642 being both aspheric. Furthermore, each of the object-side surface 641 and the image-side surface 642 of the fourth lens element 640 includes at least one inflection point.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one inflection point.

The seventh lens element 670 with positive refractive power has an object-side surface 671 being concave in a paraxial region thereof and an image-side surface 672 being convex in a paraxial region thereof. The seventh lens element 670 is made of a plastic material, and has the object-side surface 671 and the image-side surface 672 being both aspheric.

The IR-cut filter 680 is made of a glass material and located between the seventh lens element 670 and the image surface 690, and will not affect the focal length of the photographing optical lens assembly.

The detailed optical data of the 6th embodiment are shown in Table 11 and the aspheric surface data are shown in Table 12 below.

TABLE 11

6th Embodiment
f = 6.16 mm, Fno = 2.45, HFOV = 21.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | -0.654 | | | | |
| 2 | Lens 1 | 1.537 ASP | 1.057 | Plastic | 1.544 | 56.0 | 2.61 |
| 3 | | -14.491 ASP | 0.115 | | | | |
| 4 | Lens 2 | -18.580 ASP | 0.220 | Plastic | 1.639 | 23.3 | -4.33 |
| 5 | | 3.269 ASP | 0.441 | | | | |
| 6 | Lens 3 | 71.366 ASP | 0.220 | Plastic | 1.535 | 55.8 | -16.21 |
| 7 | | 7.725 ASP | 0.304 | | | | |
| 8 | Lens 4 | 68.089 ASP | 0.259 | Plastic | 1.639 | 23.3 | 19.48 |
| 9 | | -15.202 ASP | 0.124 | | | | |
| 10 | Lens 5 | -12.217 ASP | 0.220 | Plastic | 1.535 | 55.8 | -24.79 |
| 11 | | -155.931 ASP | 0.711 | | | | |
| 12 | Lens 6 | -9.848 ASP | 0.220 | Plastic | 1.544 | 56.0 | -5.87 |
| 13 | | 4.761 ASP | 0.137 | | | | |
| 14 | Lens 7 | -18.619 ASP | 0.697 | Plastic | 1.639 | 23.5 | 97.83 |
| 15 | | -14.553 ASP | 0.300 | | | | |
| 16 | IR-cut filter | Plano | 0.210 | Glass | 1.517 | 64.2 | — |
| 17 | | Plano | 0.317 | | | | |
| 18 | Image | Plano | — | | | | |

Reference wavelength is 587.6 nm (d-line).

TABLE 12

Aspheric Coefficients

| Surface # | 2 | 3 | 4 | 5 | 6 | 7 | 8 |
|---|---|---|---|---|---|---|---|
| k = | -1.1642E-01 | -2.6582E+01 | -7.3778E+01 | -2.2676E+00 | -8.7819E+01 | 4.1689E+01 | -8.9694E+01 |
| A4 = | 6.6285E-03 | -1.9071E-02 | -1.0358E-01 | -4.8163E-02 | -6.1969E-03 | -1.8156E-02 | -3.8897E-02 |
| A6 = | -6.4338E-03 | -5.1092E-03 | 1.9822E-01 | 2.8370E-01 | 8.3100E-02 | 4.9744E-02 | -2.3033E-03 |
| A8 = | 1.4333E-02 | 2.0430E-01 | 1.3372E-01 | -6.1567E-02 | 1.3465E-01 | 6.5826E-02 | 4.6351E-03 |
| A10 = | -1.0502E-02 | -3.3810E-01 | -5.4657E-01 | -1.0399E-01 | -2.3036E-01 | -1.2390E-01 | -1.3335E-03 |
| A12 = | 3.8258E-03 | 2.3309E-01 | 4.8759E-01 | 1.1429E-01 | 1.5425E-01 | 8.2898E-02 | -2.3329E-04 |
| A14 = | | -6.1101E-02 | -1.5344E-01 | | -4.0283E-02 | -2.5792E-02 | -3.2920E-03 |

| Surface # | 9 | 10 | 11 | 12 | 13 | 14 | 15 |
|---|---|---|---|---|---|---|---|
| k = | 8.3766E+01 | 7.8291E+00 | 9.0000E+01 | 3.2088E+01 | 1.3448E+00 | 9.0000E+01 | 4.7990E+01 |
| A4 = | 1.5740E-02 | 1.3920E-02 | -1.2978E-02 | -1.7245E-01 | -1.7786E-01 | -1.1048E-01 | -1.3706E-01 |
| A6 = | 7.0736E-03 | 2.0079E-03 | 6.6686E-03 | -3.6749E-02 | 3.5165E-02 | 9.6861E-02 | 7.7647E-02 |
| A8 = | 2.8411E-03 | 4.3594E-04 | 4.3277E-03 | 7.8726E-02 | 3.0716E-02 | -4.8853E-02 | -3.1883E-02 |
| A10 = | 5.8614E-04 | 7.3163E-04 | 5.6449E-04 | -3.5859E-02 | -2.7489E-02 | 1.3985E-02 | 8.0432E-03 |
| A12 = | 2.3853E-04 | -3.3389E-05 | -2.6037E-04 | 3.0063E-03 | 8.8678E-03 | -2.3320E-03 | -1.1717E-03 |
| A14 = | 4.7706E-04 | -4.7730E-04 | -3.4795E-04 | 1.6628E-03 | -1.3699E-03 | 2.2385E-04 | 9.1219E-05 |
| A16 = | | | | -2.0758E-04 | 8.5992E-05 | -9.5409E-06 | -3.2845E-06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.16 | |f/f4| | 0.32 |
| Fno | 2.45 | (|P3| + |P4| + |P5| + |P7|)/ (|P1| + |P2| + |P6|) | 0.21 |

-continued

| 6th Embodiment | | | |
|---|---|---|---|
| HFOV [deg.] | 21.0 | Yc62/CT6 | 2.64 |
| V7 | 23.5 | |Dr1s|/CT2 | 2.97 |
| R1/CT1 | 1.45 | TL/f | 0.90 |
| T56/(ΣAT − T56) | 0.63 | f/ImgH | 2.53 |
| f/R1 | 4.01 | Y11/ImgH | 0.52 |
| f/R14 | -0.42 | BL/ImgH | 0.34 |
| f6/f7 | -0.06 | | |

Furthermore, in the 6th embodiment, among the first lens element 610, the second lens element 620, the third lens element 630, the fourth lens element 640, the fifth lens element 650, the sixth lens element 660 and the seventh lens element 670, at least one lens element with positive refractive power has an Abbe number which is smaller than 25.

That is, both of the Abbe number of the fourth lens element 640 and the Abbe number of the seventh lens element 670 are smaller than 25.

7th Embodiment

Figure 13:
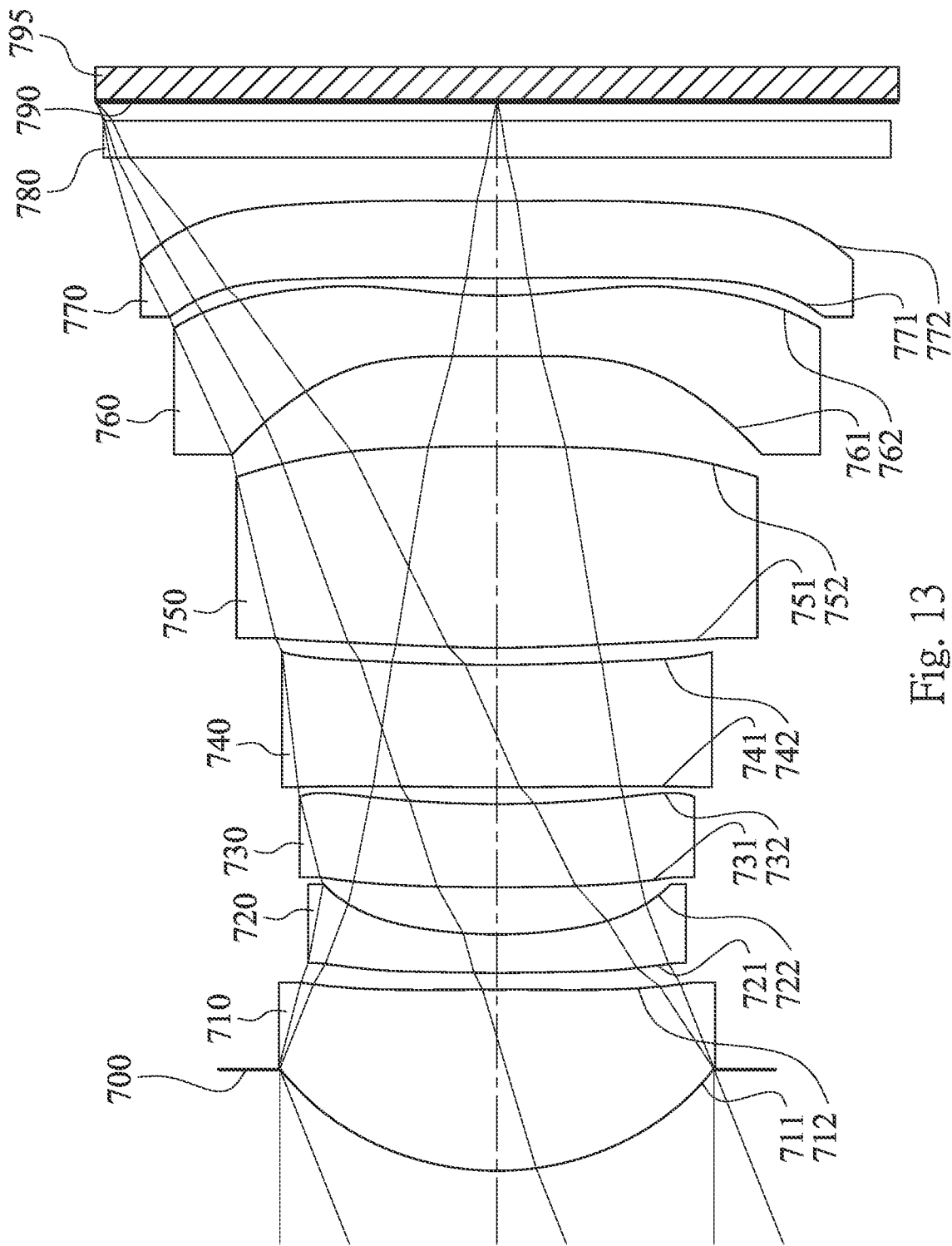
FIG. 13 is a schematic view of an image capturing device according to the 7th embodiment of the present disclosure.
Figure 14:
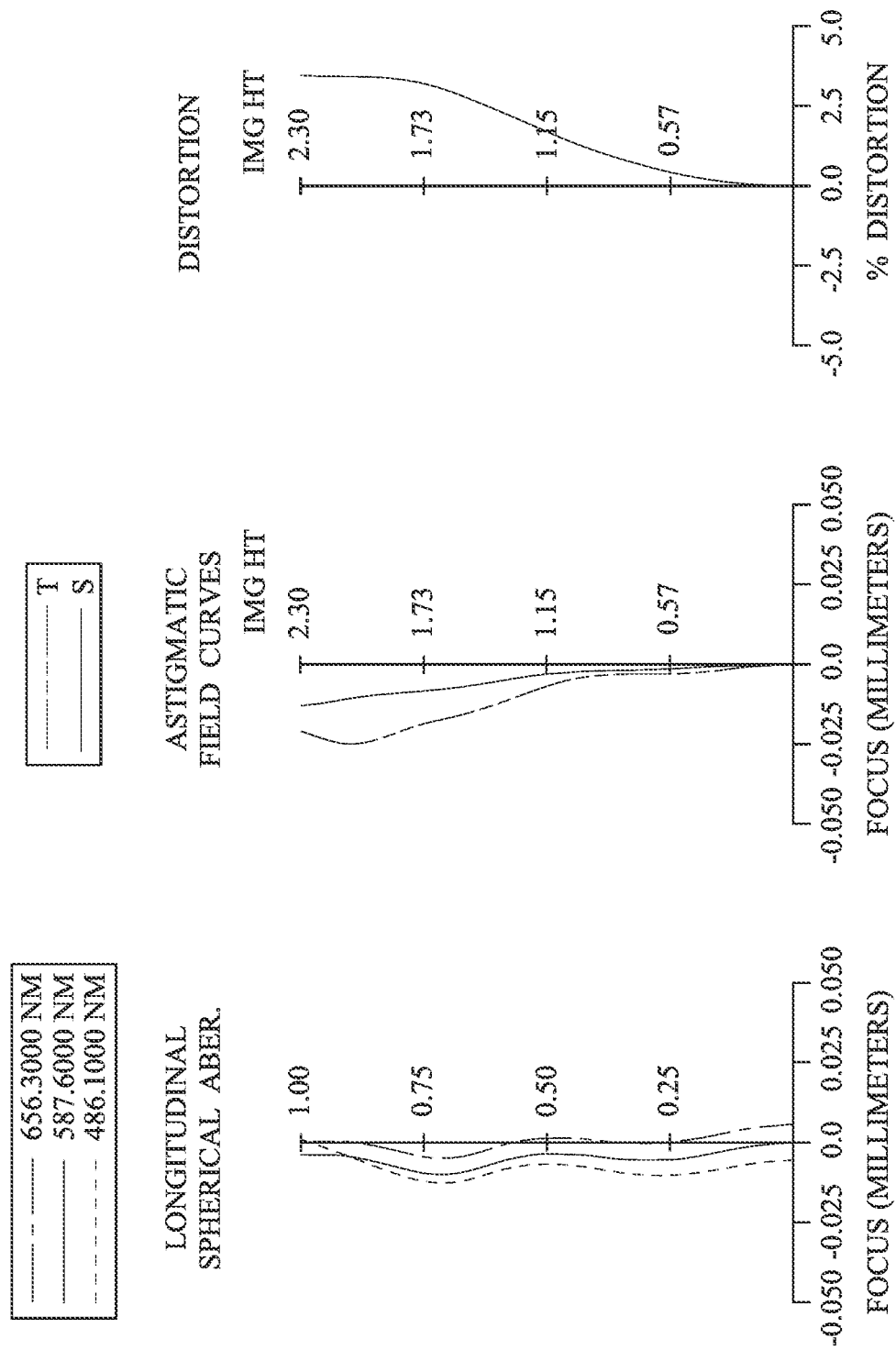
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing optical lens assembly (its reference numeral is omitted) and an image sensor 795. The photographing optical lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, an IR-cut filter 780 and an image surface 790, wherein the image sensor 795 is disposed on the image surface 790 of the photographing optical lens assembly. The photographing optical lens assembly has a total of seven lens elements (710-770).

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, the object-side surface 741 of the fourth lens element 740 includes at least one inflection point.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point.

The seventh lens element 770 with positive refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric.

The IR-cut filter 780 is made of a glass material and located between the seventh lens element 770 and the image surface 790, and will not affect the focal length of the photographing optical lens assembly.

The detailed optical data of the 7th embodiment are shown in Table 13 and the aspheric surface data are shown in Table 14 below.

TABLE 13

7th Embodiment
f = 5.59 mm, Fno = 2.25, HFOV = 21.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.580 | | | | |
| 2 | Lens 1 | 1.670 | ASP | 1.037 | Plastic | 1.544 | 55.9 | 3.05 |
| 3 | | −186.098 | ASP | 0.097 | | | | |
| 4 | Lens 2 | 10.810 | ASP | 0.220 | Plastic | 1.639 | 23.5 | −5.32 |
| 5 | | 2.563 | ASP | 0.270 | | | | |
| 6 | Lens 3 | 10.819 | ASP | 0.477 | Plastic | 1.544 | 55.9 | −25.89 |
| 7 | | 6.025 | ASP | 0.096 | | | | |
| 8 | Lens 4 | 19.116 | ASP | 0.702 | Plastic | 1.660 | 20.4 | −34.04 |
| 9 | | 10.177 | ASP | 0.098 | | | | |
| 10 | Lens 5 | 7.956 | ASP | 1.153 | Plastic | 1.514 | 56.8 | 12.73 |
| 11 | | −34.844 | ASP | 0.519 | | | | |
| 12 | Lens 6 | 53.960 | ASP | 0.345 | Plastic | 1.514 | 56.8 | −5.79 |
| 13 | | 2.813 | ASP | 0.100 | | | | |
| 14 | Lens 7 | 13.418 | ASP | 0.442 | Plastic | 1.660 | 20.4 | 56.04 |
| 15 | | 20.782 | ASP | 0.250 | | | | |
| 16 | IR-cut filter | Plano | | 0.210 | Glass | 1.517 | 64.2 | — |
| 17 | | Plano | | 0.111 | | | | |
| 18 | Image | Plano | | — | | | | |

Reference wavelength is 587.6 nm (d-line).

TABLE 14

Aspheric Coefficients

| Surface # | 2 | 3 | 4 | 5 | 6 | 7 | 8 |
|---|---|---|---|---|---|---|---|
| k = | −9.3949E−02 | −9.0000E+01 | −7.5260E+01 | −6.9770E+00 | −4.8689E+01 | 1.4970E+01 | −8.9954E+01 |
| A4 = | 8.7527E−03 | −6.6993E−04 | −1.0114E−01 | −6.1932E−02 | −4.7422E−02 | −4.0348E−02 | −2.7860E−02 |
| A6 = | −5.3645E−03 | −1.0546E−03 | 1.9562E−01 | 2.9440E−01 | 7.4904E−02 | 2.7915E−01 | 8.1477E−03 |
| A8 = | 1.3677E−02 | 1.9013E−01 | 1.3836E−01 | −5.5578E−02 | 1.1669E−01 | 6.0246E−02 | 3.8490E−03 |
| A10 = | −9.3524E−03 | −3.3489E−01 | −5.4770E−01 | −1.3374E−01 | −2.4026E−01 | −1.3397E−01 | −3.6120E−03 |
| A12 = | 3.4651E−03 | 2.4123E−01 | 4.7389E−01 | 8.7398E−02 | 1.5472E−01 | 7.4616E−02 | 2.3558E−04 |
| A14 = | | −6.6194E−02 | −1.4589E−01 | | −4.4155E−02 | −1.9277E−02 | |

| Surface # | 9 | 10 | 11 | 12 | 13 | 14 | 15 |
|---|---|---|---|---|---|---|---|
| k = | 9.0000E+01 | −7.7972E+01 | 8.9163E+01 | 9.0000E+01 | 1.4674E−01 | 4.0738E+01 | 6.2838E+01 |
| A4 = | −8.5408E−03 | −1.6233E−02 | −4.2063E−02 | −1.7301E−01 | −1.8507E−01 | −9.4764E−02 | −7.5949E−02 |
| A6 = | −1.3012E−03 | −1.8593E−03 | 4.7163E−03 | −3.3749E−02 | 3.7597E−02 | 9.1506E−02 | 6.5656E−02 |
| A8 = | 3.1147E−04 | 3.7597E−03 | 8.7914E−04 | 7.9972E−02 | 3.1839E−02 | −4.9483E−02 | −3.2115E−02 |
| A10 = | 4.5623E−03 | 4.3346E−04 | −1.1836E−04 | −3.4759E−02 | −2.7426E−02 | 1.3944E−02 | 8.0834E−03 |
| A12 = | 6.3928E−05 | | | 3.1569E−03 | 8.8544E−03 | −2.3335E−03 | −1.1653E−03 |
| A14 = | | | | 1.5548E−03 | −1.3751E−03 | 2.2402E−04 | 9.2097E−05 |
| A16 = | | | | −3.3018E−04 | 8.5389E−05 | −9.4722E−06 | −3.0527E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.59 | \|f/f4\| | 0.16 |
| Fno | 2.25 | (\|P3\| + \|P4\| + \|P5\| + \|P7\|)/ (\|P1\| + \|P2\| + \|P6\|) | 0.24 |
| HFOV [deg.] | 21.7 | Yc62/CT6 | 2.43 |
| V7 | 20.4 | \|Dr1s\|/CT2 | 2.64 |
| R1/CT1 | 1.61 | TL/f | 1.10 |
| T56/(ΣAT − T56) | 0.79 | f/ImgH | 2.43 |
| f/R1 | 3.35 | Y11/ImgH | 0.54 |
| f/R14 | 0.27 | BL/ImgH | 0.25 |
| f6/f7 | −0.10 | | |

Furthermore, in the 7th embodiment, among the first lens element 710, the second lens element 720, the third lens element 730, the fourth lens element 740, the fifth lens element 750, the sixth lens element 760 and the seventh lens element 770, at least one lens element with positive refractive power has an Abbe number which is smaller than 25. That is, the Abbe number of the seventh lens element 770 is smaller than 25.

8th Embodiment

Figure 15:
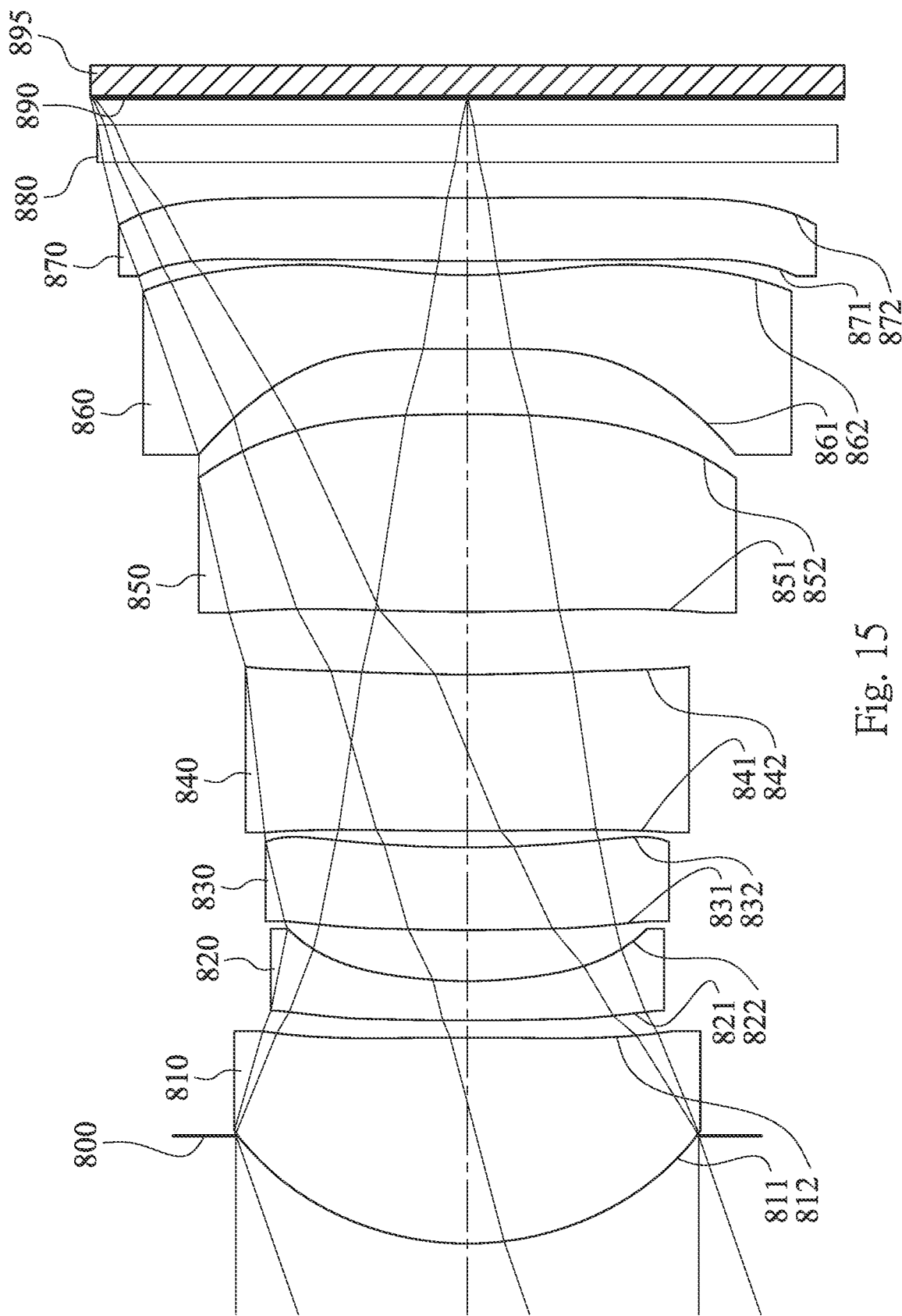
FIG. 15 is a schematic view of an image capturing device according to the 8th embodiment of the present disclosure.
Figure 16:
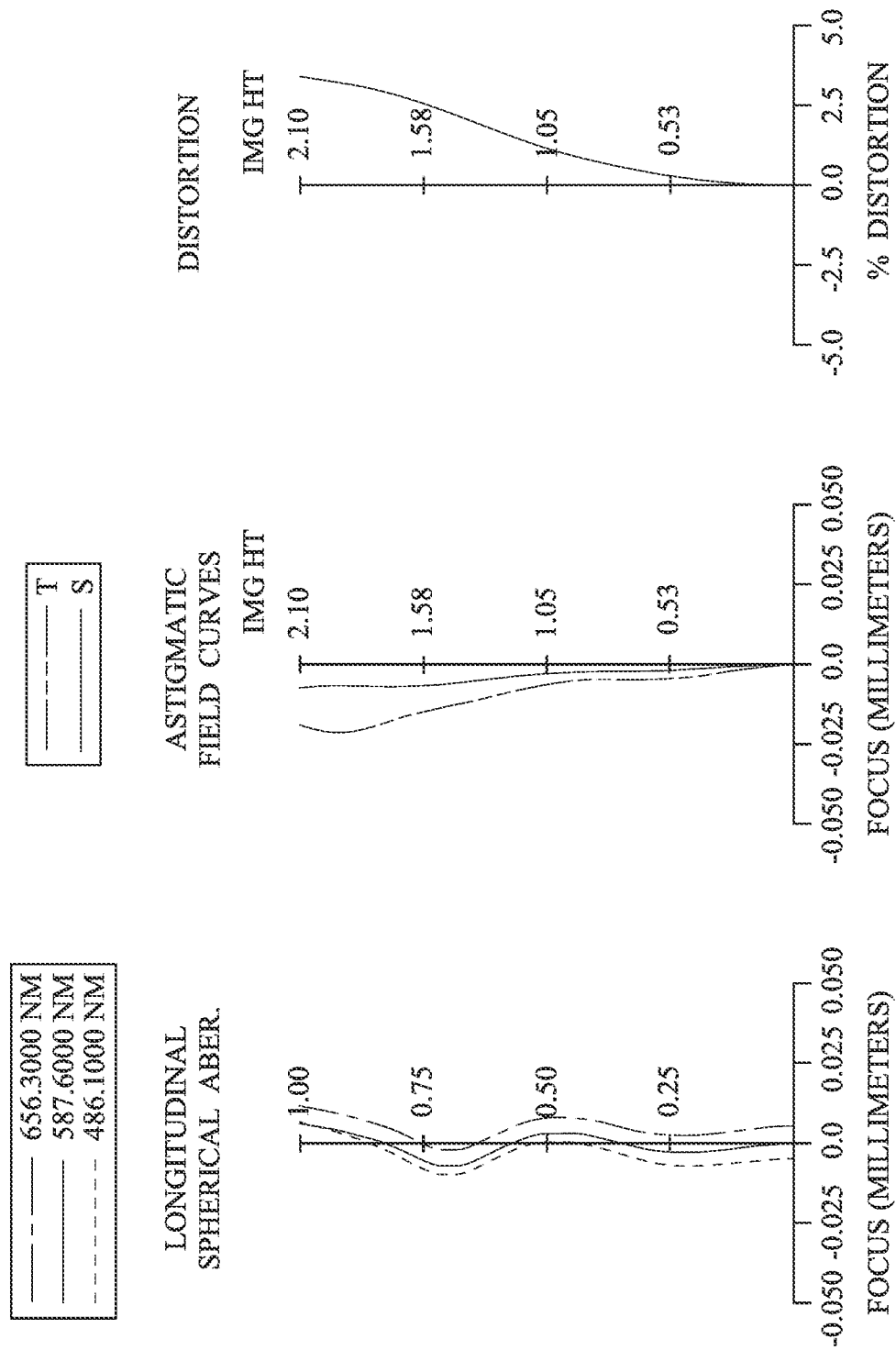
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes a photographing optical lens assembly (its reference numeral is omitted) and an image sensor 895. The photographing optical lens assembly includes, in order from an object side to an image side, an aperture stop 800, a first lens element 810, a second lens element 820, a third lens element 830, a fourth lens element 840, a fifth lens element 850, a sixth lens element 860, a seventh lens element 870, an IR-cut filter 880 and an image surface 890, wherein the image sensor 895 is disposed on the image surface 890 of the photographing optical lens assembly. The photographing optical lens assembly has a total of seven lens elements (810-870).

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, each of the object-side surface 841 and the image-side surface 842 of the fourth lens element 840 includes at least one inflection point.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point.

The seventh lens element 870 with positive refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric.

The IR-cut filter 880 is made of a glass material and located between the seventh lens element 870 and the image surface 890, and will not affect the focal length of the photographing optical lens assembly.

The detailed optical data of the 8th embodiment are shown in Table 15 and the aspheric surface data are shown in Table 16 below.

TABLE 15

8th Embodiment
f = 5.83 mm, Fno = 2.25, HFOV = 19.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.604 | | | | |
| 2 | Lens 1 | 1.726 ASP | 1.153 | Plastic | 1.544 | 55.9 | 3.09 |
| 3 | | −46.733 ASP | 0.097 | | | | |
| 4 | Lens 2 | 12.194 ASP | 0.220 | Plastic | 1.639 | 23.5 | −5.13 |
| 5 | | 2.566 ASP | 0.286 | | | | |
| 6 | Lens 3 | 11.048 ASP | 0.463 | Plastic | 1.544 | 55.9 | −24.40 |
| 7 | | 5.942 ASP | 0.093 | | | | |
| 8 | Lens 4 | 19.815 ASP | 0.876 | Plastic | 1.660 | 20.4 | −38.94 |
| 9 | | 10.992 ASP | 0.351 | | | | |
| 10 | Lens 5 | 12.127 ASP | 1.107 | Plastic | 1.514 | 56.8 | 10.86 |
| 11 | | −10.009 ASP | 0.367 | | | | |
| 12 | Lens 6 | 191.264 ASP | 0.412 | Plastic | 1.514 | 56.8 | −5.53 |
| 13 | | 2.796 ASP | 0.079 | | | | |
| 14 | Lens 7 | 12.774 ASP | 0.353 | Plastic | 1.660 | 20.4 | 69.65 |
| 15 | | 17.495 ASP | 0.200 | | | | |
| 16 | IR-cut filter | Plano | 0.210 | Glass | 1.517 | 64.2 | — |
| 17 | | Plano | 0.152 | | | | |
| 18 | Image | Plano | — | | | | |

Reference wavelength is 587.6 nm (d-line).

TABLE 16

Aspheric Coefficients

| Surface # | 2 | 3 | 4 | 5 | 6 | 7 | 8 |
|---|---|---|---|---|---|---|---|
| k = | −1.0506E−01 | 1.7034E+01 | −7.6409E+01 | −6.6863E+00 | −7.5034E+01 | 1.3806E+01 | −9.0000E+01 |
| A4 = | 7.9432E−03 | −4.1498E−04 | −1.0138E−01 | −6.1781E−02 | −5.0429E−02 | −4.0778E−02 | −2.8621E−02 |
| A6 = | −5.3395E−03 | −1.2838E−03 | 1.9484E−01 | 2.9249E−01 | 7.5539E−02 | 2.5246E−02 | 6.4687E−03 |
| A8 = | 1.3621E−02 | 1.8923E−01 | 1.3639E−01 | −5.6913E−02 | 1.1817E−01 | 5.7417E−02 | 1.9540E−03 |
| A10 = | −9.4855E−03 | −3.3674E−01 | −5.5030E−01 | −1.3390E−01 | −2.4269E−01 | −1.3612E−01 | −4.3821E−03 |
| A12 = | 3.1289E−03 | 2.4046E−01 | 4.7278E−01 | 8.2791E−02 | 1.5088E−01 | 7.4724E−02 | 8.4833E−04 |
| A14 = | | −6.3433E−02 | −1.4086E−01 | | −4.3446E−02 | −1.7843E−02 | |

| Surface # | 9 | 10 | 11 | 12 | 13 | 14 | 15 |
|---|---|---|---|---|---|---|---|
| k = | −7.6413E+01 | −6.9105E+01 | 3.4336E+01 | −9.0000E+01 | 2.2700E−01 | 3.6744E+01 | 4.0364E+01 |
| A4 = | −1.2964E−02 | −2.0597E−02 | −5.5726E−02 | −1.8115E−01 | −1.7824E−01 | −8.8514E−02 | −6.8094E−02 |
| A6 = | −2.9735E−03 | −4.6472E−03 | 4.9694E−03 | −3.0919E−02 | 3.6752E−02 | 9.2746E−02 | 6.4457E−02 |
| A8 = | −6.4803E−04 | 2.6283E−03 | 1.3335E−03 | 7.9078E−02 | 3.2005E−02 | −4.9716E−02 | −3.1785E−02 |
| A10 = | 3.9129E−03 | −9.1565E−05 | −1.4832E−04 | −3.4831E−02 | −2.7437E−02 | 1.4026E−02 | 8.0933E−03 |
| A12 = | −2.6466E−04 | | | 3.1985E−03 | 8.8495E−03 | −2.3206E−03 | −1.1670E−03 |
| A14 = | | | | 1.5668E−03 | −1.3750E−03 | 2.2181E−04 | 9.1185E−05 |
| A16 = | | | | −3.3108E−04 | 8.5708E−05 | −1.1194E−05 | −3.3679E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.83 | \|f/f4\| | 0.15 |
| Fno | 2.25 | (\|P3\| + \|P4\| + \|P5\| + \|P7\|)/ (\|P1\| + \|P2\| + \|P6\|) | 0.25 |
| HFOV [deg.] | 19.2 | Yc62/CT6 | 2.16 |
| V7 | 20.4 | \|Dr1s\|/CT2 | 2.75 |
| R1/CT1 | 1.50 | TL/f | 1.10 |
| T56/(ΣAT − T56) | 0.41 | f/ImgH | 2.77 |
| f/R1 | 3.38 | Y11/ImgH | 0.62 |
| f/R14 | 0.33 | BL/ImgH | 0.27 |
| f6/f7 | −0.08 | | |

Furthermore, in the 8th embodiment, among the first lens element 810, the second lens element 820, the third lens element 830, the fourth lens element 840, the fifth lens element 850, the sixth lens element 860 and the seventh lens element 870, at least one lens element with positive refractive power has an Abbe number which is smaller than 25. That is, the Abbe number of the seventh lens element 870 is smaller than 25.

9th Embodiment

Figure 17:
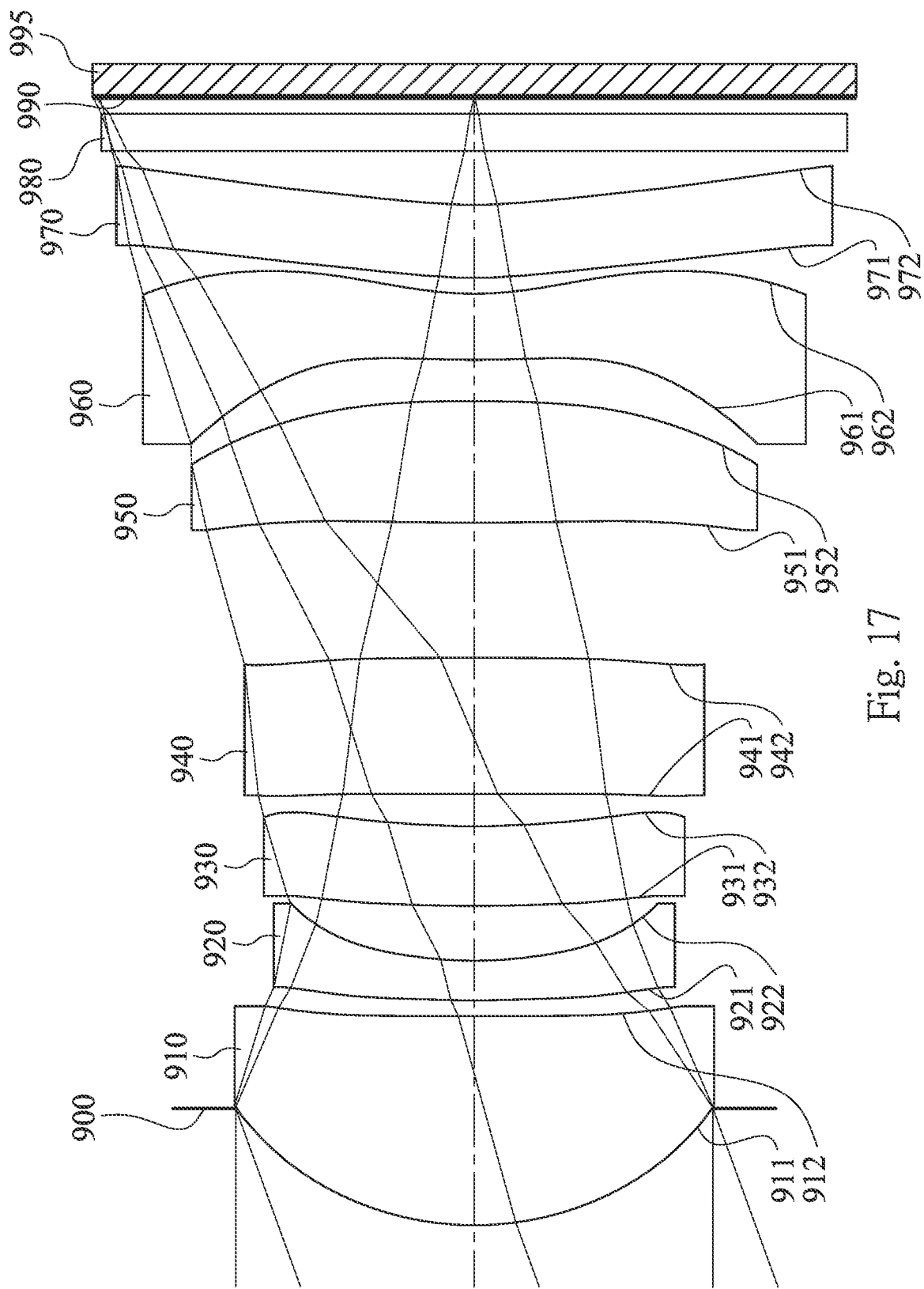
FIG. 17 is a schematic view of an image capturing device according to the 9th embodiment of the present disclosure.
Figure 18:
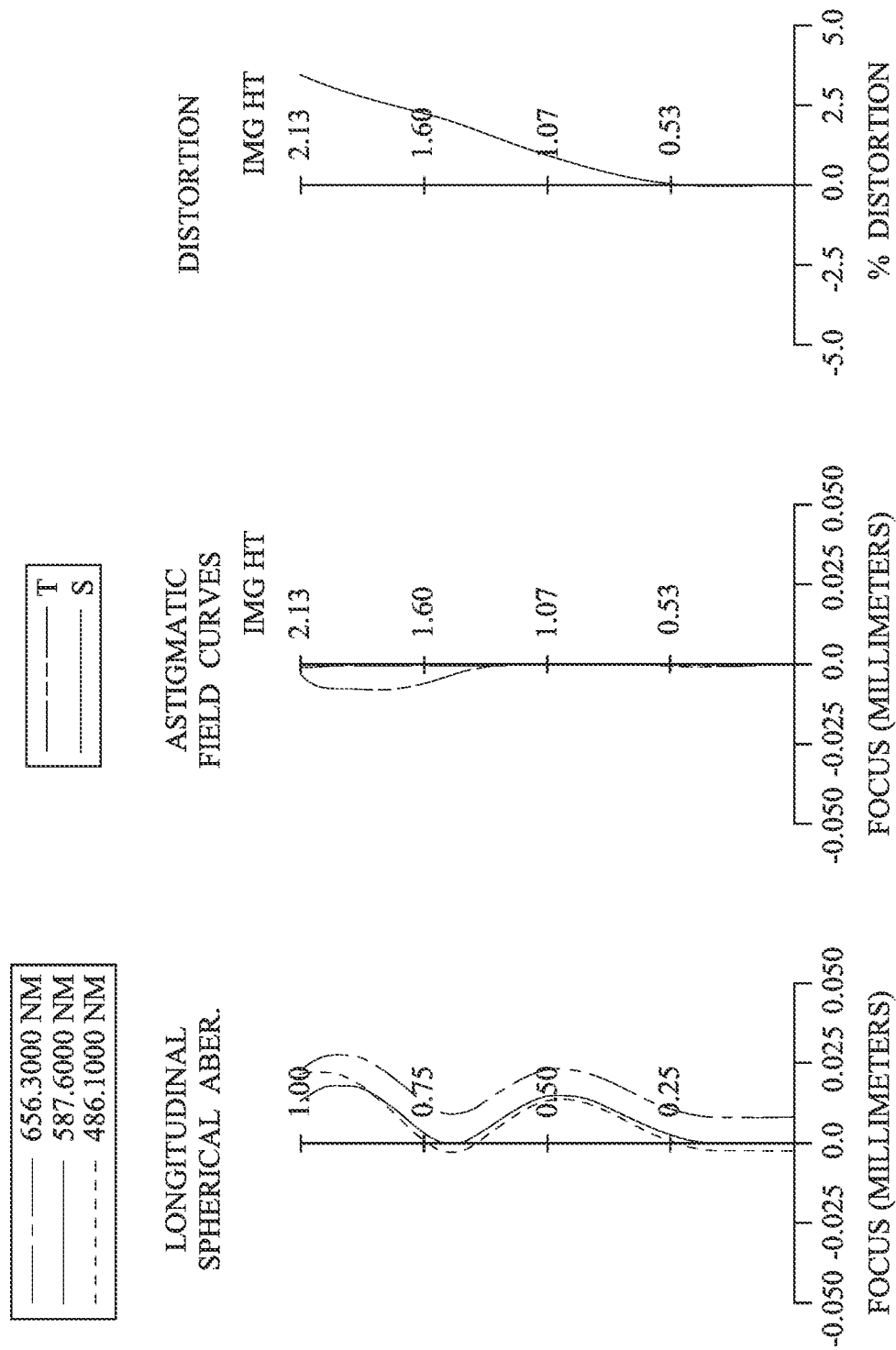
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes a photographing optical lens assembly (its reference numeral is omitted) and an image sensor 995. The photographing optical lens assembly includes, in order from an object side to an image side, an aperture stop 900, a first lens element 910, a second lens element 920, a third lens element 930, a fourth lens element 940, a fifth lens element 950, a sixth lens element 960, a seventh lens element 970, an IR-cut filter 980 and an image surface 990, wherein the image sensor 995 is disposed on the image surface 990 of the photographing optical lens assembly. The photographing optical lens assembly has a total of seven lens elements (910-970).

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of a plastic material, and has the object-side surface 941 and the image-side surface 942 being both aspheric. Furthermore, each of the object-side surface 941 and the image-side surface 942 of the fourth lens element 940 includes at least one inflection point.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric. Furthermore, each of the object-side surface 961 and the image-side surface 962 of the sixth lens element 960 includes at least one inflection point.

The seventh lens element 970 with positive refractive power has an object-side surface 971 being convex in a paraxial region thereof and an image-side surface 972 being concave in a paraxial region thereof. The seventh lens element 970 is made of a plastic material, and has the object-side surface 971 and the image-side surface 972 being both aspheric.

The IR-cut filter 980 is made of a glass material and located between the seventh lens element 970 and the image surface 990, and will not affect the focal length of the photographing optical lens assembly.

The detailed optical data of the 9th embodiment are shown in Table 17 and the aspheric surface data are shown in Table 18 below.

TABLE 17

9th Embodiment
f = 5.66 mm, Fno = 2.12, HFOV = 20.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.653 | | | | |
| 2 | Lens 1 | 1.750 ASP | 1.170 | Plastic | 1.544 | 55.9 | 3.23 |
| 3 | | 297.503 ASP | 0.088 | | | | |
| 4 | Lens 2 | 7.579 ASP | 0.221 | Plastic | 1.650 | 21.4 | −5.14 |

TABLE 17-continued

9th Embodiment
f = 5.66 mm, Fno = 2.12, HFOV = 20.0 deg.

| Surface # | | Curvature Radius | Thickness | Material | Index | Abbe # | Focal Length |
|---|---|---|---|---|---|---|---|
| 5 | | 2.290 ASP | 0.306 | | | | |
| 6 | Lens 3 | 8.044 ASP | 0.446 | Plastic | 1.544 | 55.9 | −26.23 |
| 7 | | 5.044 ASP | 0.181 | | | | |
| 8 | Lens 4 | 49.728 ASP | 0.761 | Plastic | 1.660 | 20.4 | 43.25 |
| 9 | | −66.579 ASP | 0.756 | | | | |
| 10 | Lens 5 | 22.241 ASP | 0.679 | Plastic | 1.514 | 56.8 | 13.79 |
| 11 | | −10.288 ASP | 0.231 | | | | |
| 12 | Lens 6 | 5.895 ASP | 0.370 | Plastic | 1.514 | 56.8 | −5.69 |
| 13 | | 1.912 ASP | 0.089 | | | | |
| 14 | Lens 7 | 2.854 ASP | 0.408 | Plastic | 1.530 | 55.8 | 98.16 |
| 15 | | 2.870 ASP | 0.300 | | | | |
| 16 | IR-cut filter | Plano | 0.210 | Glass | 1.517 | 64.2 | — |
| 17 | | Plano | 0.093 | | | | |
| 18 | Image | Plano | — | | | | |

Reference wavelength is 587.6 nm (d-line).

TABLE 18

Aspheric Coefficients

| Surface # | 2 | 3 | 4 | 5 | 6 | 7 | 8 |
|---|---|---|---|---|---|---|---|
| k = | −1.8456E−01 | 9.0000E+01 | −5.5627E+01 | −6.4891E+00 | −8.1281E+01 | 1.3419E+01 | 9.0000E+01 |
| A4 = | 9.5549E−03 | 1.6127E−03 | −1.0076E−01 | −6.4012E−02 | −5.0175E−02 | −4.4111E−02 | −2.6811E−02 |
| A6 = | −4.0601E−03 | 4.8711E−03 | 1.9511E−01 | 2.9285E−01 | 7.8000E−02 | 2.7230E−02 | 4.5802E−03 |
| A8 = | 1.3607E−02 | 1.8492E−01 | 1.4061E−01 | −5.6552E−02 | 1.1636E−01 | 5.7306E−02 | 1.3834E−03 |
| A10 = | −9.5625E−03 | −3.4165E−01 | −5.5142E−01 | −1.4413E−01 | −5.2041E−01 | −1.4146E−01 | −2.0113E−03 |
| A12 = | 3.0867E−03 | 2.4358E−01 | 4.6071E−01 | 8.7064E−02 | 1.4997E−01 | 7.2540E−02 | 2.7702E−03 |
| A14 = | | −6.3579E−02 | −1.3324E−01 | | −3.8371E−02 | −1.2924E−02 | |

| Surface # | 9 | 10 | 11 | 12 | 13 | 14 | 15 |
|---|---|---|---|---|---|---|---|
| k = | −9.0000E+01 | 8.6009E+01 | 3.4319E+01 | 2.2486E−01 | −3.0192E−01 | −2.4604E+01 | −3.3102E+01 |
| A4 = | −2.0820E−02 | −1.2347E−02 | −6.1008E−02 | −1.8099E−01 | −1.9679E−01 | −8.8605E−02 | −6.3672E−02 |
| A6 = | −3.9622E−03 | −9.6049E−03 | 1.2736E−02 | −3.0633E−02 | 3.1550E−02 | 9.2779E−02 | 6.5933E−02 |
| A8 = | −4.8968E−04 | 2.6239E−03 | 1.3301E−03 | 7.9129E−02 | 3.2406E−02 | −4.8639E−02 | −3.1504E−02 |
| A10 = | 3.1979E−03 | 8.3360E−05 | −5.3129E−04 | −3.4713E−02 | −2.7265E−02 | 1.4180E−02 | 8.0957E−03 |
| A12 = | 7.1690E−04 | | | 3.1897E−03 | 8.8804E−03 | −2.3510E−03 | −1.1581E−03 |
| A14 = | | | | 1.5531E−03 | −1.3758E−03 | 2.1807E−04 | 9.2713E−05 |
| A16 = | | | | −3.2969E−04 | 8.2922E−05 | −1.0046E−05 | −3.9479E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.66 | \|f/f4\| | 0.13 |
| Fno | 2.12 | (\|P3\| + \|P4\| + \|P5\| + \|P7\|)/(\|P1\| + \|P2\| + \|P6\|) | 0.21 |
| HFOV [deg.] | 20.0 | Yc62/CT6 | 3.08 |
| V7 | 55.8 | \|Dr1s\|/CT2 | 2.95 |
| R1/CT1 | 1.50 | TL/f | 1.12 |
| T56/(ΣAT − T56) | 0.16 | f/ImgH | 2.65 |
| f/R1 | 3.23 | Y11/ImgH | 0.63 |

-continued

| 9th Embodiment | | | |
|---|---|---|---|
| f/R14 | 1.97 | BL/ImgH | 0.28 |
| f6/f7 | −0.06 | | |

Furthermore, in the 9th embodiment, among the first lens element 910, the second lens element 920, the third lens element 930, the fourth lens element 940, the fifth lens element 950, the sixth lens element 960 and the seventh lens element 970, at least one lens element with positive refractive power has an Abbe number which is smaller than 25. That is, the Abbe number of the fourth lens element 940 is smaller than 25.

10th Embodiment

Figure 19:
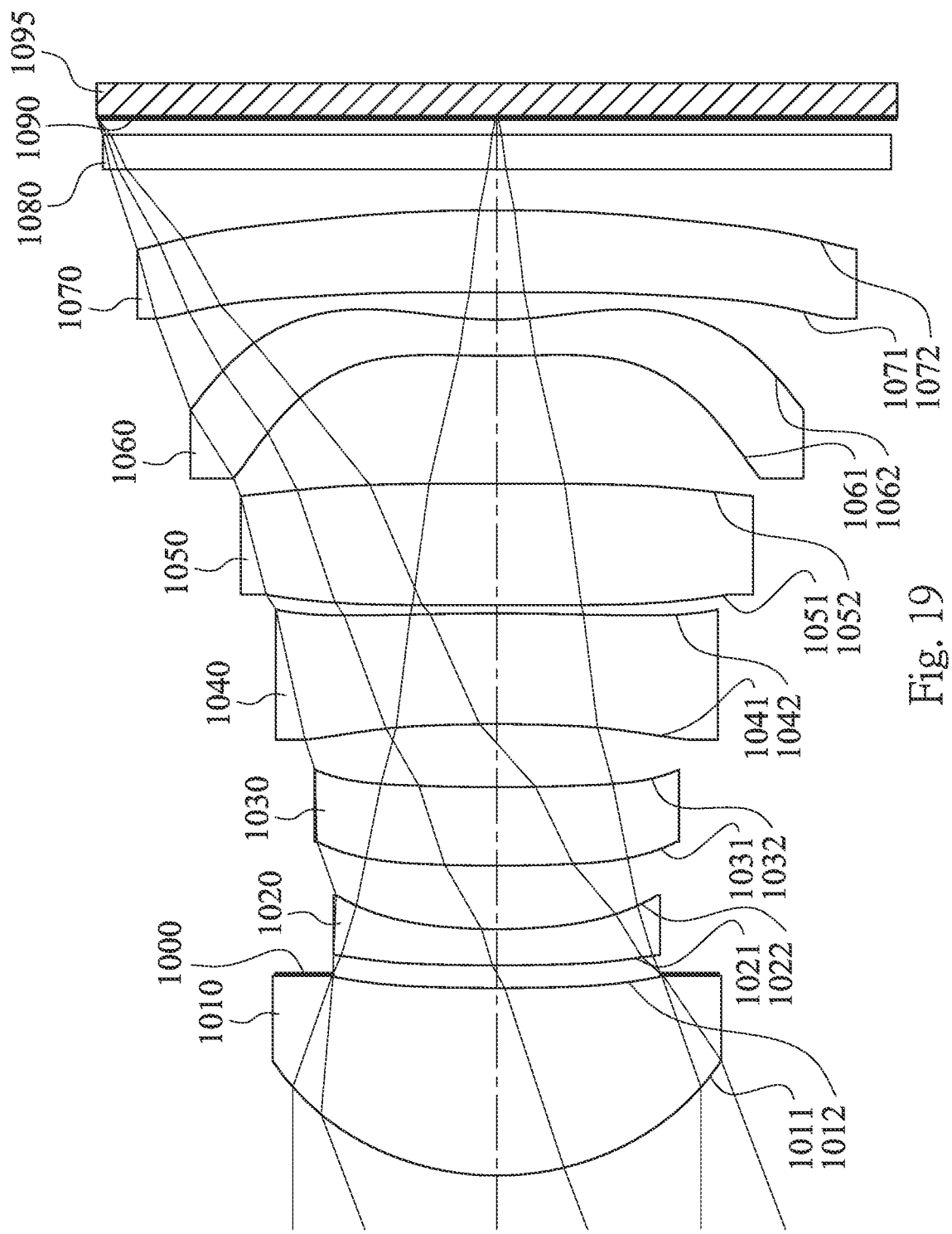
FIG. 19 is a schematic view of an image capturing device according to the embodiment of the present disclosure.
Figure 20:
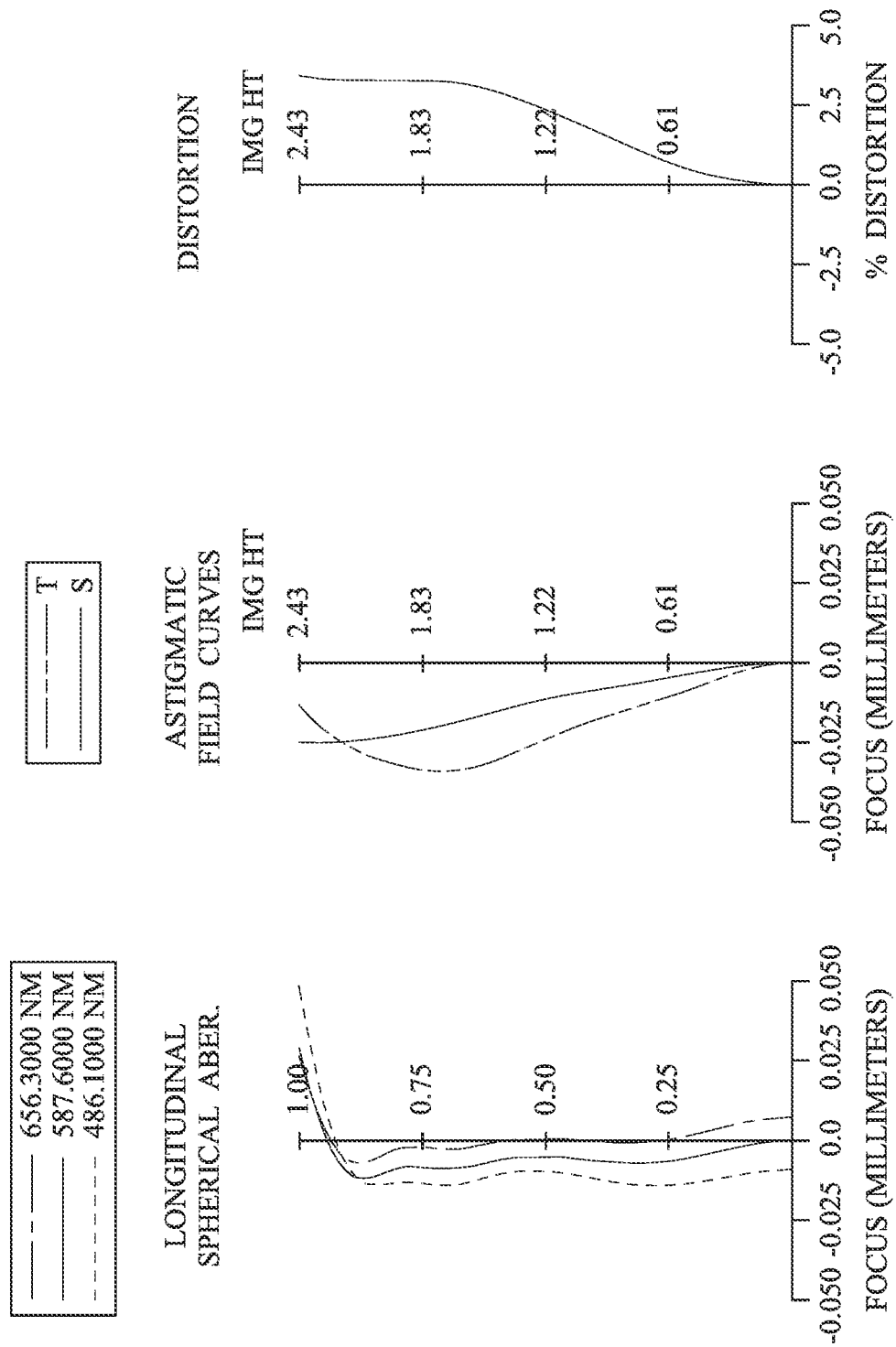
FIG. 20 shows spherical aberration curves, astigmatic field curves and a distortion curve of the image capturing device according to the 10th embodiment.

FIG. 19 is a schematic view of an image capturing device according to the embodiment of the present disclosure. FIG. 20 shows spherical aberration curves, astigmatic field curves and a distortion curve of the image capturing device according to the 10th embodiment. In FIG. 19, the image capturing device includes a photographing optical lens assembly (its reference numeral is omitted) and an image sensor 1095. The photographing optical lens assembly includes, in order from an object side to an image side, a first lens element 1010, an aperture stop 1000, a second lens element 1020, a third lens element 1030, a fourth lens element 1040, a fifth lens element 1050, a sixth lens element 1060, a seventh lens element 1070, an IR-cut filter 1080 and an image surface 1090, wherein the image sensor 1095 is disposed on the image surface 1090 of the photographing optical lens assembly. The photographing optical lens assembly has a total of seven lens elements (1010-1070).

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of a plastic material, and has the object-side surface 1041 and the image-side surface 1042 being both aspheric. Furthermore, each of the object-side surface 1041 and the image-side surface 1042 of the fourth lens element 1040 includes at least one inflection point.

The fifth lens element 1050 with negative refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric.

The sixth lens element 1060 with negative refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, each of the object-side surface 1061 and the image-side surface 1062 of the sixth lens element 1060 includes at least one inflection point.

The seventh lens element 1070 with positive refractive power has an object-side surface 1071 being convex in a paraxial region thereof and an image-side surface 1072 being convex in a paraxial region thereof. The seventh lens element 1070 is made of a plastic material, and has the object-side surface 1071 and the image-side surface 1072 being both aspheric.

The IR-cut filter 1080 is made of a glass material and located between the seventh lens element 1070 and the image surface 1090, and will not affect the focal length of the photographing optical lens assembly.

The detailed optical data of the 10th embodiment are shown in Table 19 and the aspheric surface data are shown in Table 20 below.

TABLE 19

10th Embodiment
f = 6.21 mm, Fno = 2.50, HFOV = 20.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.755 | ASP | 1.142 | Plastic | 1.535 | 56.3 | 3.66 |
| 2 | | 13.085 | ASP | 0.088 | | | | |
| 3 | Ape. Stop | Plano | | 0.050 | | | | |
| 4 | Lens 2 | 10.100 | ASP | 0.220 | Plastic | 1.660 | 20.4 | −7.47 |
| 5 | | 3.283 | ASP | 0.387 | | | | |
| 6 | Lens 3 | 9.417 | ASP | 0.478 | Plastic | 1.544 | 56.0 | 89.51 |
| 7 | | 11.466 | ASP | 0.384 | | | | |
| 8 | Lens 4 | −12.319 | ASP | 0.674 | Plastic | 1.639 | 23.5 | −64.67 |
| 9 | | −17.930 | ASP | 0.050 | | | | |
| 10 | Lens 5 | −520.650 | ASP | 0.740 | Plastic | 1.639 | 23.5 | −873.78 |
| 11 | | −7783.993 | ASP | 0.779 | | | | |
| 12 | Lens 6 | 8.299 | ASP | 0.220 | Plastic | 1.544 | 56.0 | −5.80 |
| 13 | | 2.266 | ASP | 0.166 | | | | |
| 14 | Lens 7 | 24.244 | ASP | 0.499 | Plastic | 1.639 | 23.5 | 18.55 |
| 15 | | −22.977 | ASP | 0.250 | | | | |
| 16 | IR-cut filter | Plano | | 0.210 | Glass | 1.517 | 64.2 | — |
| 17 | | Plano | | 0.104 | | | | |
| 18 | Image | Plano | | — | | | | |

Reference wavelength is 587.6 nm (d-line).

TABLE 20

Aspheric Coefficients

| Surface # | 1 | 2 | 4 | 5 | 6 | 7 | 8 |
|---|---|---|---|---|---|---|---|
| k = | −1.0746E−01 | 8.1928E+01 | 8.9950E+01 | −5.1425E+00 | −7.5952E+01 | −8.9999E+01 | 6.2234E+01 |
| A4 = | 8.0837E−03 | −7.3250E−03 | −9.8844E−02 | −5.6663E−02 | −1.9880E−02 | −2.9322E−02 | −4.4123E−02 |
| A6 = | −7.4965E−03 | 5.7340E−03 | 2.0339E−01 | 2.7957E−01 | 7.1989E−02 | 4.2572E−02 | 6.7415E−03 |
| A8 = | 1.5014E−02 | 2.0422E−01 | 1.2747E−01 | −7.0137E−02 | 1.2662E−01 | 7.2625E−02 | 9.5942E−03 |
| A10 = | −8.8719E−03 | −3.3161E−01 | −5.7272E−01 | −1.5037E−01 | −2.3354E−01 | −1.1685E−01 | 8.3292E−04 |
| A12 = | 2.8427E−03 | 2.0592E−01 | 4.8812E−01 | 7.8052E−02 | 1.5366E−01 | 8.4308E−02 | −4.9264E−09 |
| A14 = | −1.4445E−04 | −5.0563E−02 | −1.5878E−01 | 2.0227E−07 | −3.9685E−02 | −2.4006E−02 | |

| Surface # | 9 | 10 | 11 | 12 | 13 | 14 | 15 |
|---|---|---|---|---|---|---|---|
| k = | 3.7124E+00 | 9.0000E+01 | −5.3178E+01 | −1.1696E+01 | −1.8396E+00 | 3.4255E+01 | −8.9067E+01 |
| A4 = | 1.3692E−02 | 1.4749E−02 | −2.1548E−02 | −1.8381E−01 | −2.1116E−01 | −9.7854E−02 | −7.0875E−02 |
| A6 = | 2.0696E−03 | 3.0456E−03 | 1.0547E−03 | −3.8719E−02 | 3.6343E−02 | 9.5944E−02 | 6.9284E−02 |
| A8 = | 6.3897E−04 | −2.0002E−04 | 1.2468E−03 | 7.6968E−02 | 3.1849E−02 | −4.9143E−02 | −3.2102E−02 |
| A10 = | 5.6208E−04 | −4.8659E−04 | −1.6777E−04 | −3.5713E−02 | −2.7417E−02 | 1.3954E−02 | 8.0688E−03 |
| A12 = | 5.3827E−06 | 5.1749E−05 | 3.9811E−05 | 3.2678E−03 | 8.8469E−03 | −2.3340E−03 | −1.1661E−03 |
| A14 = | | | | 1.7015E−03 | −1.3738E−03 | 2.2377E−04 | 9.2322E−05 |
| A16 = | | | | −3.0176E−04 | 8.7990E−05 | −9.5428E−06 | −3.0387E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table as the following values and satisfy the following conditions:

| 10th Embodiment | | | |
|---|---|---|---|
| f [mm] | 6.21 | |f/f4| | 0.10 |
| Fno | 2.50 | (|P3| + |P4| + |P5| + |P7|)/ (|P1| + |P2| + |P6|) | 0.14 |
| HFOV [deg.] | 20.8 | Yc62/CT6 | 3.59 |
| V7 | 23.5 | |Dr1s|/CT2 | 5.59 |
| R1/CT1 | 1.54 | TL/f | 1.04 |
| T56/(ΣAT − T56) | 0.69 | f/ImgH | 2.55 |
| f/R1 | 3.54 | Y11/ImgH | 0.56 |
| f/R14 | −0.27 | BL/ImgH | 0.23 |
| f6/f7 | −0.31 | | |

Furthermore, in the 10th embodiment, among the first lens element 1010, the second lens element 1020, the third lens element 1030, the fourth lens element 1040, the fifth lens element 1050, the sixth lens element 1060 and the seventh lens element 1070, at least one lens element with positive refractive power has an Abbe number which is smaller than 25. That is, the Abbe number of the seventh lens element 1070 is smaller than 25.

11th Embodiment

Figure 21:
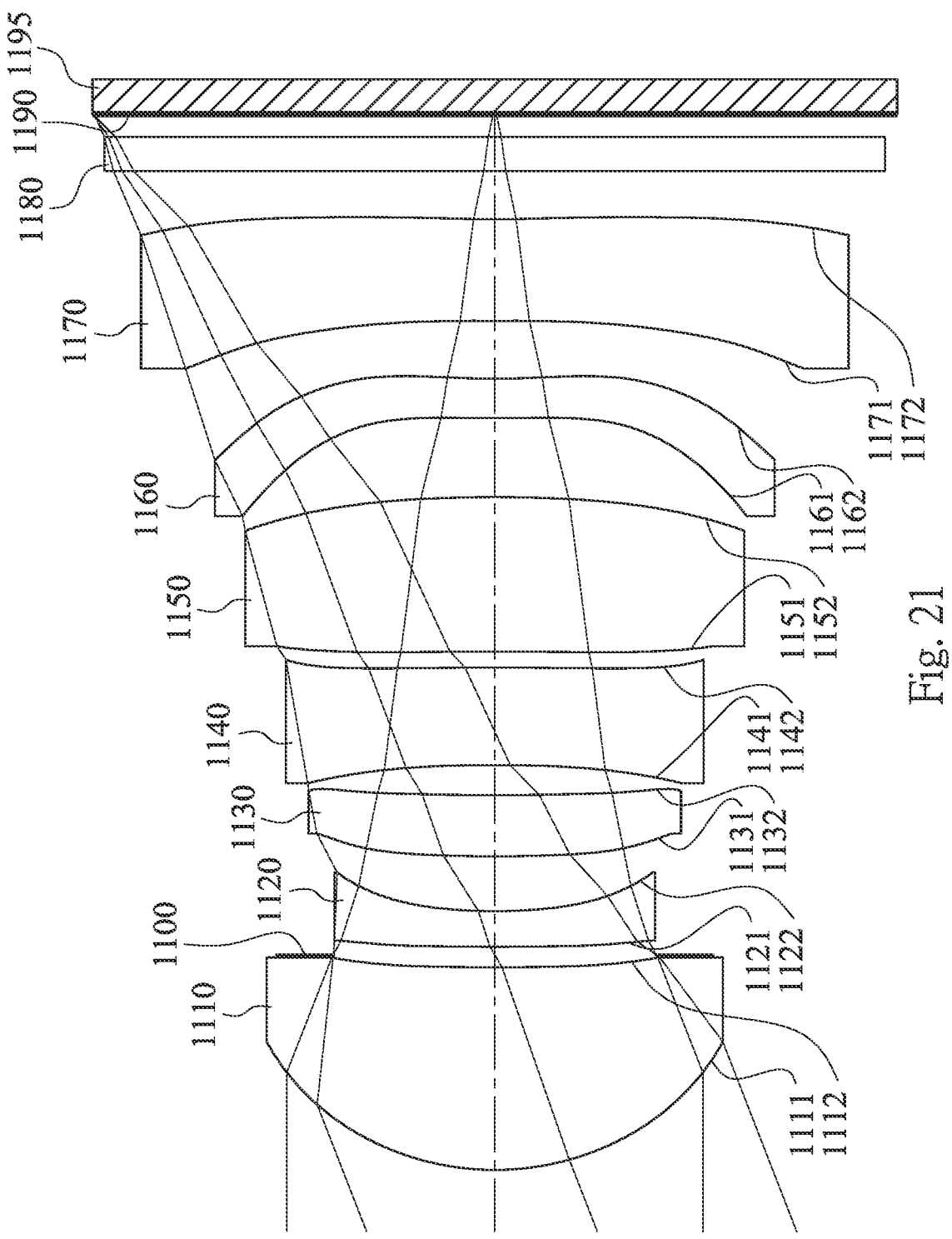
FIG. 21 is a schematic view of an image capturing device according to the 11th embodiment of the present disclosure.
Figure 22:
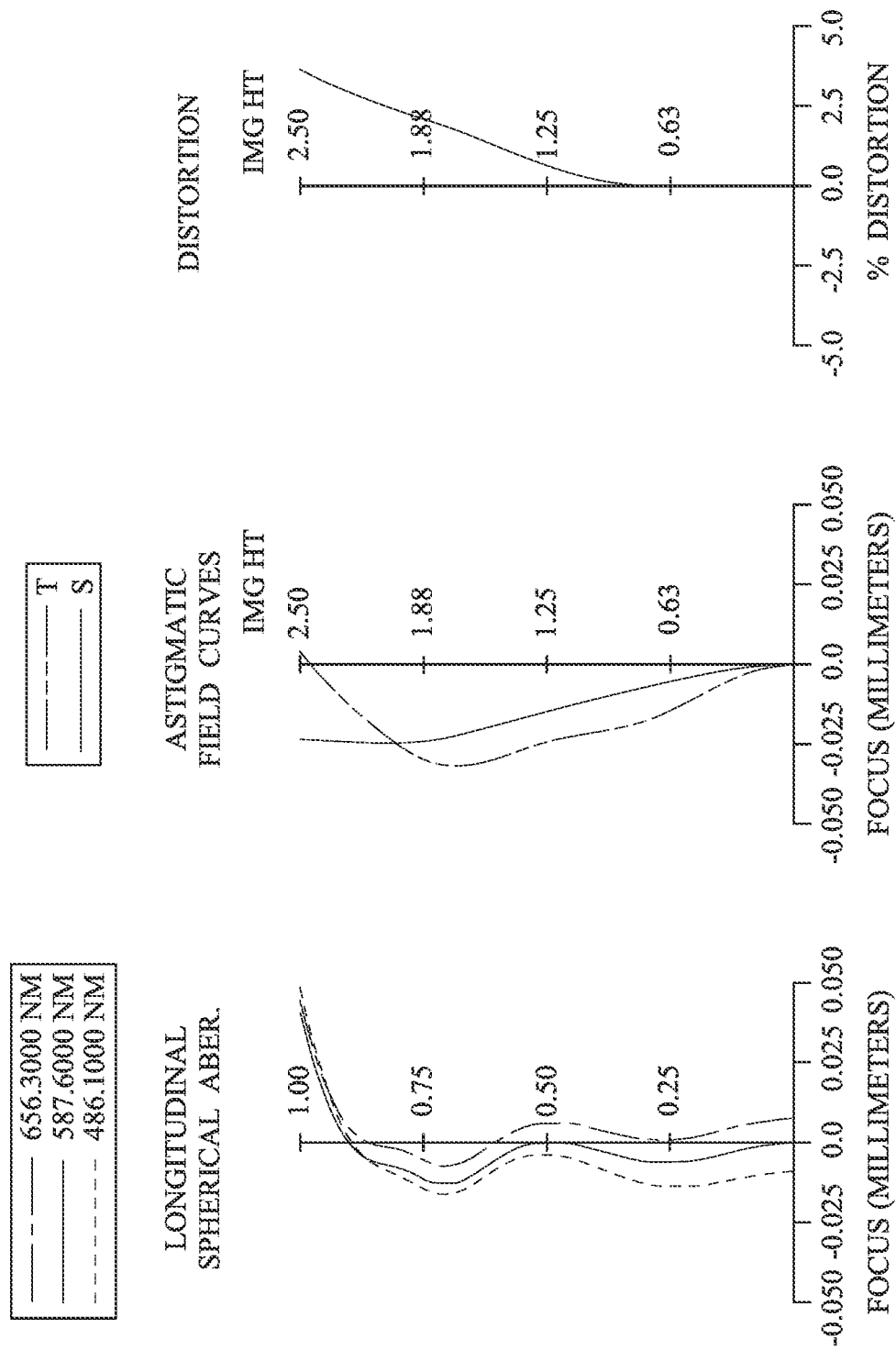
FIG. 22 shows spherical aberration curves, astigmatic field curves and a distortion curve of the image capturing device according to the 11th embodiment.

FIG. 21 is a schematic view of an image capturing device according to the 11th embodiment of the present disclosure. FIG. 22 shows spherical aberration curves, astigmatic field curves and a distortion curve of the image capturing device according to the 11th embodiment. In FIG. 21, the image capturing device includes a photographing optical lens assembly (its reference numeral is omitted) and an image sensor 1195. The photographing optical lens assembly includes, in order from an object side to an image side, a first lens element 1110, an aperture stop 1100, a second lens element 1120, a third lens element 1130, a fourth lens element 1140, a fifth lens element 1150, a sixth lens element 1160, a seventh lens element 1170, an IR-cut filter 1180 and an image surface 1190, wherein the image sensor 1195 is disposed on the image surface 1190 of the photographing optical lens assembly. The photographing optical lens assembly has a total of seven lens elements (1110-1170).

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of a plastic material, and has the object-side surface 1131 and the image-side surface 1132 being both aspheric.

The fourth lens element 1140 with negative refractive power has an object-side surface 1141 being concave in a paraxial region thereof and an image-side surface 1142 being convex in a paraxial region thereof. The fourth lens element 1140 is made of a plastic material, and has the object-side surface 1141 and the image-side surface 1142 being both aspheric. Furthermore, the image-side surface 1142 of the fourth lens element 1140 includes at least one inflection point.

The fifth lens element 1150 with positive refractive power has an object-side surface 1151 being concave in a paraxial region thereof and an image-side surface 1152 being convex in a paraxial region thereof. The fifth lens element 1150 is made of a plastic material, and has the object-side surface 1151 and the image-side surface 1152 being both aspheric.

The sixth lens element 1160 with negative refractive power has an object-side surface 1161 being convex in a paraxial region thereof and an image-side surface 1162 being concave in a paraxial region thereof. The sixth lens element 1160 is made of a plastic material, and has the object-side surface 1161 and the image-side surface 1162 being both aspheric. Furthermore, each of the object-side surface 1161 and the image-side surface 1162 of the sixth lens element 1160 includes at least one inflection point.

The seventh lens element 1170 with negative refractive power has an object-side surface 1171 being concave in a paraxial region thereof and an image-side surface 1172 being concave in a paraxial region thereof. The seventh lens element 1170 is made of a plastic material, and has the object-side surface 1171 and the image-side surface 1172 being both aspheric.

The IR-cut filter 1180 is made of a glass material and located between the seventh lens element 1170 and the image surface 1190, and will not affect the focal length of the photographing optical lens assembly.

The detailed optical data of the 11th embodiment are shown in Table 21 and the aspheric surface data are shown in Table 22 below.

TABLE 21

11th Embodiment
f = 6.21 mm, Fno = 2.40, HFOV = 21.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.734 | ASP | 1.260 | Plastic | 1.544 | 56.0 | 3.47 |
| 2 | | 15.937 | ASP | 0.077 | | | | |
| 3 | Ape. Stop | Plano | | 0.051 | | | | |
| 4 | Lens 2 | 14.813 | ASP | 0.220 | Plastic | 1.639 | 23.5 | −5.78 |
| 5 | | 2.937 | ASP | 0.342 | | | | |
| 6 | Lens 3 | 8.607 | ASP | 0.381 | Plastic | 1.544 | 56.0 | 34.06 |
| 7 | | 15.819 | ASP | 0.187 | | | | |
| 8 | Lens 4 | −10.561 | ASP | 0.606 | Plastic | 1.639 | 23.5 | −26.49 |
| 9 | | −28.748 | ASP | 0.100 | | | | |
| 10 | Lens 5 | −33.186 | ASP | 0.960 | Plastic | 1.639 | 23.3 | 24.08 |
| 11 | | −10.628 | ASP | 0.492 | | | | |
| 12 | Lens 6 | 13.528 | ASP | 0.245 | Plastic | 1.544 | 56.0 | −12.96 |
| 13 | | 4.605 | ASP | 0.360 | | | | |
| 14 | Lens 7 | −130.276 | ASP | 0.632 | Plastic | 1.639 | 23.3 | −12.73 |
| 15 | | 8.689 | ASP | 0.300 | | | | |
| 16 | IR-cut filter | Plano | | 0.210 | Glass | 1.517 | 64.2 | — |
| 17 | | Plano | | 0.145 | | | | |
| 18 | Image | Plano | | — | | | | |

Reference wavelength is 587.6 nm (d-line).

TABLE 22

Aspheric Coefficients

| Surface # | 1 | 2 | 4 | 5 | 6 | 7 | 8 |
|---|---|---|---|---|---|---|---|
| k = | −1.1821E−01 | 9.0000E+01 | 6.3210E+01 | −3.6587E+00 | −1.8222E+01 | −7.7800E+01 | 7.0582E+01 |
| A4 = | 8.3856E−03 | −1.0951E−02 | −9.9908E−02 | −5.3171E−02 | −2.3103E−02 | −3.1085E−02 | −3.3386E−02 |
| A6 = | −8.4669E−03 | 1.0486E−03 | 2.0575E−01 | 2.8582E−01 | 7.2677E−02 | 3.2691E−02 | 9.7772E−03 |
| A8 = | 1.5573E−02 | 2.0602E−01 | 1.3274E−01 | −6.9901E−02 | 1.2402E−01 | 6.7570E−02 | 5.9026E−03 |
| A10 = | −8.9916E−03 | −3.2623E−01 | −5.7383E−01 | −1.4633E−01 | −2.3344E−01 | −1.1786E−01 | −5.2640E−04 |
| A12 = | 2.5213E−03 | 2.0520E−01 | 4.8349E−01 | 7.9727E−02 | 1.5923E−01 | 8.2836E−02 | 1.1248E−05 |
| A14 = | | −5.1813E−02 | −1.4747E−01 | | −4.7421E−02 | −2.8707E−02 | |

| Surface # | 9 | 10 | 11 | 12 | 13 | 14 | 15 |
|---|---|---|---|---|---|---|---|
| k = | 9.0000E+01 | 8.9360E+01 | 3.6709E+01 | 5.1030E+01 | 6.4931E−01 | 9.0000E+01 | −1.0682E+01 |
| A4 = | 1.3056E−02 | 1.5035E−02 | −1.9537E−02 | −1.7193E−01 | −1.9588E−01 | −1.0398E−01 | −9.1170E−02 |
| A6 = | 3.6333E−03 | 1.9245E−03 | 3.3055E−03 | −3.2644E−02 | 3.6430E−02 | 9.5161E−02 | 7.2072E−02 |
| A8 = | 1.0059E−03 | −6.0489E−05 | 1.4950E−03 | 7.6798E−02 | 3.1565E−02 | −4.9070E−02 | −3.1910E−02 |
| A10 = | 6.3894E−04 | −2.0245E−04 | −4.4958E−04 | −3.5670E−02 | −2.7568E−02 | 1.3989E−02 | 8.0381E−03 |
| A12 = | 3.7850E−04 | 1.0643E−04 | | 3.2889E−03 | 8.8338E−03 | −2.3282E−03 | −1.1708E−03 |
| A14 = | | | | 1.6756E−03 | −1.3640E−03 | 2.2424E−04 | 9.2140E−05 |
| A16 = | | | | −3.3006E−04 | 9.4347E−05 | −9.6497E−06 | −2.9895E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 6.21 | |f/f4| | 0.23 |
| Fno | 2.40 | (|P3| + |P4| + |P5| + |P7|)/ (|P1| + |P2| + |P6|) | 0.35 |
| HFOV [deg.] | 21.3 | Yc62/CT6 | 2.29 |
| V7 | 23.3 | |Dr1s|/CT2 | 6.08 |
| R1/CT1 | 1.38 | TL/f | 1.06 |
| T56/(ΣAT − T56) | 0.44 | f/ImgH | 2.48 |
| f/R1 | 3.58 | Y11/ImgH | 0.57 |
| f/R14 | 0.71 | BL/ImgH | 0.26 |
| f6/f7 | 1.02 | | |

Furthermore, in the 11th embodiment, among the first lens element 1110, the second lens element 1120, the third lens element 1130, the fourth lens element 1140, the fifth lens element 1150, the sixth lens element 1160 and the seventh lens element 1170, at least one lens element with positive refractive power has an Abbe number which is smaller than 25. That is, the Abbe number of the fifth lens element 1150 is smaller than 25.

12th Embodiment

Figure 26:
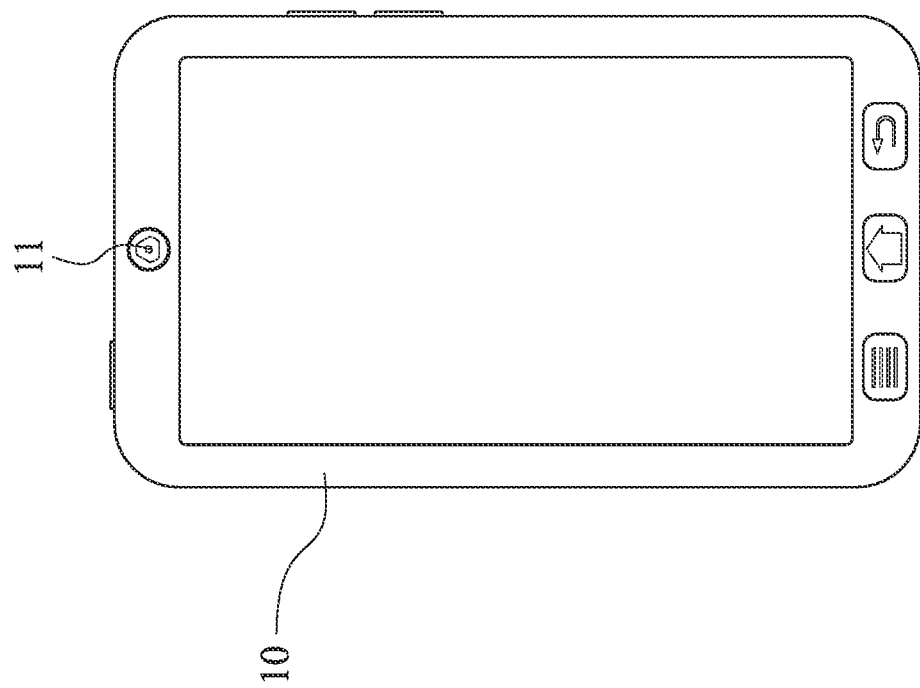
FIG. 26 is a schematic view of an electronic device according to the 12th embodiment of the present disclosure.

FIG. 26 is a schematic view of an electronic device 10 according to the 12th embodiment of the present disclosure. The electronic device 10 of the 12th embodiment is a smartphone, wherein the electronic device 10 includes an image capturing device 11. The image capturing device 11 includes a photographing optical lens assembly (its reference numeral is omitted) according to the present disclosure and an image sensor (its reference numeral is omitted), wherein the image sensor is disposed on an image surface of the photographing optical lens assembly.

13th Embodiment

Figure 27:
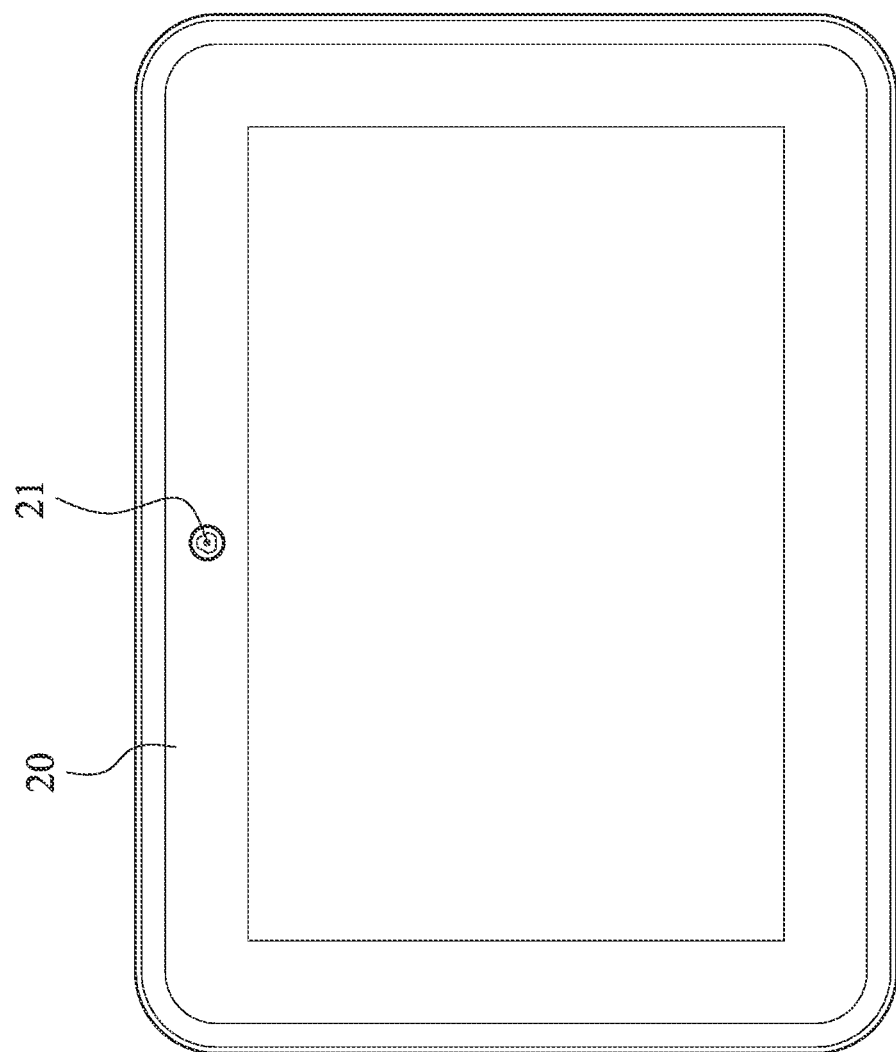
FIG. 27 is a schematic view of an electronic device according to the 13th embodiment of the present disclosure.

FIG. 27 is a schematic view of an electronic device 20 according to the 13th embodiment of the present disclosure. The electronic device 20 of the 13th embodiment is a tablet personal computer, wherein the electronic device 20 includes an image capturing device 21. The image capturing device 21 includes a photographing optical lens assembly (its reference numeral is omitted) according to the present disclosure and an image sensor (its reference numeral is omitted), wherein the image sensor is disposed on an image surface of the photographing optical lens assembly.

14th Embodiment

Figure 28:
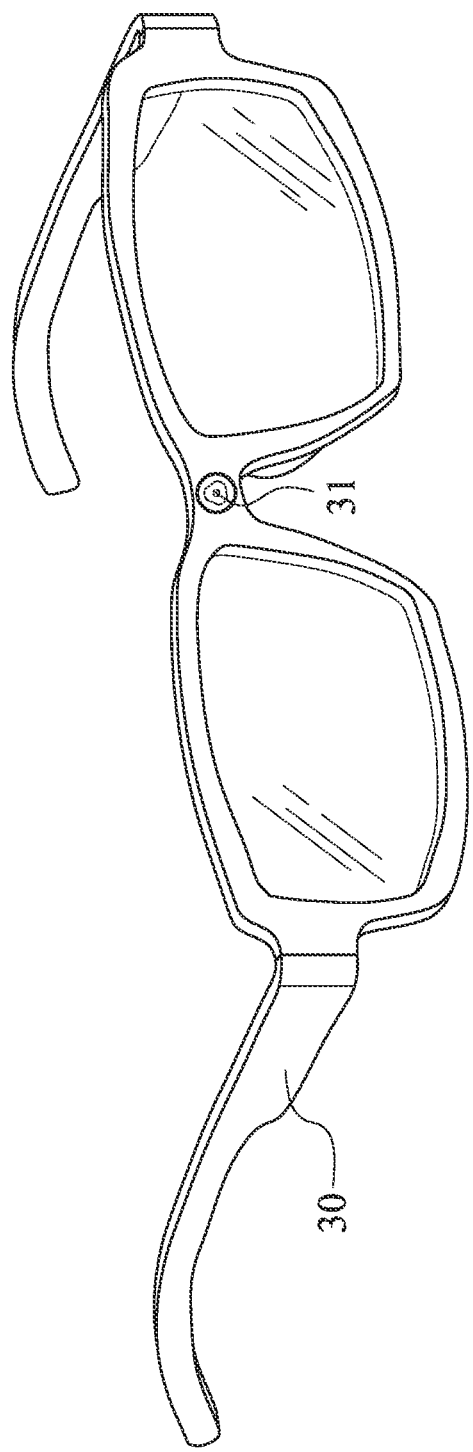
FIG. 28 is a schematic view of an electronic device according to the 14th embodiment of the present disclosure.

FIG. 28 is a schematic view of an electronic device 30 according to the 14th embodiment of the present disclosure. The electronic device 30 of the 14th embodiment is a wearable device, wherein the electronic device 30 includes an image capturing device 31. The image capturing device 31 includes a photographing optical lens assembly (its reference numeral is omitted) according to the present disclosure and an image sensor (its reference numeral is omitted), wherein the image sensor is disposed on an image surface of the photographing optical lens assembly.

The foregoing description, for purpose of explanation, has been described with reference to specific embodiments. It is to be noted that Tables 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side:
   a first lens element, a second lens element, a third lens element, a fourth lens element, a fifth lens element, a sixth lens element and a seventh lens element; each of the seven lens elements having an object-side surface facing towards the object side and an image-side surface facing towards the image side;
   wherein the first lens element has positive refractive power; the sixth lens element has the image-side surface being concave in a paraxial region thereof, at least one of the object-side surface and the image-side surface of the sixth lens element is aspheric, and the sixth lens element comprises at least one inflection point; the seventh lens element has positive refractive power;
   wherein a total number of the lens elements in the photographing optical lens assembly is seven, at least one lens element with positive refractive power of the seven lens elements has an Abbe number smaller than 25; a focal length of the photographing optical lens assembly is f, a focal length of the fourth lens element is f4, and the following condition is satisfied:

$|f/f4|<0.35.$

2. The photographing optical lens assembly of claim 1, wherein the second lens element with negative refractive power has the object-side surface being convex in a paraxial region thereof and the image-side surface being concave in a paraxial region thereof.

3. The photographing optical lens assembly of claim 1, wherein the seventh lens element has the image-side surface being convex in a paraxial region thereof; a focal length of the sixth lens element is f6, a focal length of the seventh lens element is f7, and the following condition is satisfied:

$-0.60<f6/f7<0.60.$

4. The photographing optical lens assembly of claim 1, wherein the fourth lens element has the object-side surface being concave in a paraxial region thereof; there is an air gap between each of adjacent lens elements of the seven lens elements.

5. The photographing optical lens assembly of claim 1, wherein an Abbe number of the seventh lens element is V7, and the following condition is satisfied:

$V7<30.$

6. The photographing optical lens assembly of claim 1, wherein the focal length of the photographing optical lens assembly is f, a curvature radius of the image-side surface of the seventh lens element is R14, and the following condition is satisfied:

$f/R14<1.0.$

7. The photographing optical lens assembly of claim 1, wherein the focal length of the photographing optical lens assembly is f, an axial distance between the object-side surface of the first lens element and an image surface is TL, and the following condition is satisfied:

$0.70<TL/f\leq1.04.$

8. The photographing optical lens assembly of claim 1, wherein a maximum optical effective radius of the object-side surface of the first lens element is Y11, a maximum image height of the photographing optical lens assembly is ImgH, and the following condition is satisfied:

$0.45<Y11/ImgH<1.0.$

9. The photographing optical lens assembly of claim 1, wherein a vertical distance between a non-axial critical point on the image-side surface of the sixth lens element and an optical axis is Yc62, a central thickness of the sixth lens element is CT6, and the following condition is satisfied:

$0.5<Yc62/CT6<7.5.$

10. The photographing optical lens assembly of claim 1, wherein an axial distance between the fifth lens element and the sixth lens element is T56, a sum of all axial distances between adjacent lens elements of the photographing optical lens assembly is ΣAT, and the following condition is satisfied:

$0.40<T56/(\Sigma AT-T56).$

11. The photographing optical lens assembly of claim 1, wherein the focal length of the photographing optical lens assembly is f, a curvature radius of the object-side surface of the first lens element is R1, an axial distance between the object-side surface of the first lens element and an image surface is TL, and the following conditions are satisfied:

$2.85<f/R1;$ and $0.70<TL/f\leq1.10.$

12. The photographing optical lens assembly of claim 1, further comprising:

an aperture stop disposed on an object side of the first lens element.

* * * * *